(12) United States Patent
Mathias et al.

(10) Patent No.: US 10,536,491 B2
(45) Date of Patent: Jan. 14, 2020

(54) APPARATUS, SYSTEMS AND METHODS FOR PROVIDING TELEPHONY SERVICES TO MULTIPLE DEVICES

(71) Applicant: APPLE INC., Cupertino, CA (US)

(72) Inventors: Arun Mathias, Cupertino, CA (US); Najeeb Abdulrahiman, Cupertino, CA (US); Teck Yang Lee, Cupertino, CA (US); Ajoy Singh, Cupertino, CA (US); Vikram Yerrabommanahalli, Cupertino, CA (US); Rohan Malthankar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 14/732,492

(22) Filed: Jun. 5, 2015

(65) Prior Publication Data

US 2015/0271216 A1    Sep. 24, 2015

Related U.S. Application Data

(63) Continuation-in-part of application No. 14/340,825, filed on Jul. 25, 2014.

(Continued)

(51) Int. Cl.
*H04M 1/68* (2006.01)
*H04L 29/06* (2006.01)
(Continued)

(52) U.S. Cl.
CPC ...... *H04L 65/1096* (2013.01); *H04M 3/4288* (2013.01); *H04M 3/42127* (2013.01);
(Continued)

(58) Field of Classification Search
USPC ............ 379/215.01, 142.06, 142.07, 142.08; 455/411; 370/338
See application file for complete search history.

(56) References Cited

U.S. PATENT DOCUMENTS 4,791,662 A * 12/1988 Ahnen .................. H04M 9/002
                                                    379/158
8,194,834 B2 * 6/2012 Pearson .......... H04M 1/274516
                                                   379/142.08
(Continued)

FOREIGN PATENT DOCUMENTS

CN            1794681        6/2006
CN          101558674       10/2009
(Continued)

*Primary Examiner* — Marcos Batista
(74) *Attorney, Agent, or Firm* — Fay Kaplun & Marcin, LLP

(57) ABSTRACT

Described are call handling methods performed by a carrier network or client stations. A method performed by a carrier network includes designating rules for call handling for an account, receiving first and second voice calls for the account, wherein the voice calls may be either an incoming calls or originated calls and handling the first and second voice calls for the account based on the rules. A method performed by a client station includes receiving a first invitation to a first call, responding to the first invitation causing the first call to be active, receiving a second invitation to a second call while the first call remains active and responding to the second invitation causing the second call to be active and the first call to be on hold, the client station is prevented from originating a call when one call is active and one call is on hold.

20 Claims, 11 Drawing Sheets

Related U.S. Application Data

(60) Provisional application No. 61/859,099, filed on Jul. 26, 2013, provisional application No. 62/005,924, filed on May 30, 2014.

(51) Int. Cl.
*H04W 4/16* (2009.01)
*H04M 3/428* (2006.01)
*H04M 3/54* (2006.01)
*H04M 3/42* (2006.01)
*H04M 7/00* (2006.01)

(52) U.S. Cl.
CPC ............ *H04M 3/543* (2013.01); *H04M 7/006* (2013.01); *H04W 4/16* (2013.01)

(56) References Cited

U.S. PATENT DOCUMENTS

| | | | |
|---|---|---|---|
| 8,634,331 B2 * | 1/2014 | Freeman | H04M 3/436 370/260 |
| 8,750,263 B2 | 6/2014 | Kezys et al. | |
| 2005/0086535 A1 | 4/2005 | Ernst et al. | |
| 2006/0077957 A1 * | 4/2006 | Reddy | H04M 3/42229 370/352 |
| 2007/0077966 A1 * | 4/2007 | Huang | H04W 12/06 455/558 |
| 2010/0130228 A1 * | 5/2010 | Vendrow | H04M 3/42348 455/456.1 |
| 2012/0020293 A1 * | 1/2012 | Nix, Jr. | H04L 41/0856 370/328 |
| 2013/0301577 A1 * | 11/2013 | Parlamas | H04W 76/022 370/329 |
| 2014/0063175 A1 * | 3/2014 | Jafry | H04M 1/67 348/14.02 |
| 2014/0153489 A1 | 6/2014 | Perras et al. | |

FOREIGN PATENT DOCUMENTS

| | | |
|---|---|---|
| EP | 1320236 | 6/2003 |
| JP | 2012-175148 | 9/2012 |
| JP | 2012-249102 | 12/2012 |
| TW | 200642332 | 12/2006 |
| TW | 201304481 | 1/2013 |

* cited by examiner

APPARATUS, SYSTEMS AND METHODS FOR PROVIDING TELEPHONY SERVICES TO MULTIPLE DEVICES

INCORPORATION BY REFERENCE/PRIORITY CLAIM

This application claims priority to U.S. Non-Provisional application Ser. No. 14/340,825 entitled "System and Method for Providing Telephony Services over WiFi for Non-Cellular Devices" filed on Jul. 25, 2014, U.S. Provisional Application Ser. No. 61/859,099 entitled "System and Method for Providing Telephony Services over WiFi for Non-Cellular Devices," filed on Jul. 26, 2013, and U.S. Provisional Application Ser. No. 62/005,924 entitled "System and Method for Providing Telephony Services over WiFi for Non-Cellular Devices," filed on May 30, 2014 all of which are incorporated herein, in their entirety, by reference.

BACKGROUND

A cellular phone may be registered with a cellular network with a telephony subscription plan in order to perform telephony services. However, if a client station is not a cellular device, the client station is incapable of performing telephony services.

SUMMARY

A method performed by a client station. The method including registering with a IP Multimedia Subsystem (IMS) of a carrier network, receiving a first invitation to a first incoming call from the carrier network, responding to the first invitation causing the first incoming call to be active on the client station, receiving a second invitation to a second incoming call from the carrier network while the first incoming call remains active and responding to the second invitation causing the second incoming call to be active on the client station and the first incoming call to be on hold on the client station, wherein the client station is prevented from originating a call when the second incoming call is active and the first incoming call is on hold.

A method performed by a carrier network. The method including designating a plurality of rules for call handling for an account, wherein the account has a plurality of associated client stations, wherein one of the associated client stations is designated a primary station and remaining client stations are designated secondary stations, receiving a first voice call for the account, wherein the first voice call is one of an incoming call for the account or a voice call originated from one of the plurality of associated client stations and receiving a second voice call for the account, wherein the second voice call is one of an incoming call for the account or a voice call originated from one of the plurality of associated client stations, wherein the second voice call is received while the first voice call is active and handling the first and second voice calls for the account based on the plurality of rules.

A further method performed by a carrier network. The further method including receiving an indication that a plurality of client stations are associated with an account, receiving a first incoming voice call for the account, sending a first invitation for the first incoming voice call to each of the client stations associated with the account, receiving a first response to the first invitation from one of the plurality of client stations associated with the account, receiving a second incoming voice call for the account while the first incoming voice call remains active and sending a second invitation for the second incoming voice call to each of the client stations associated with the account.

DETAILED DESCRIPTION

Figure 1:
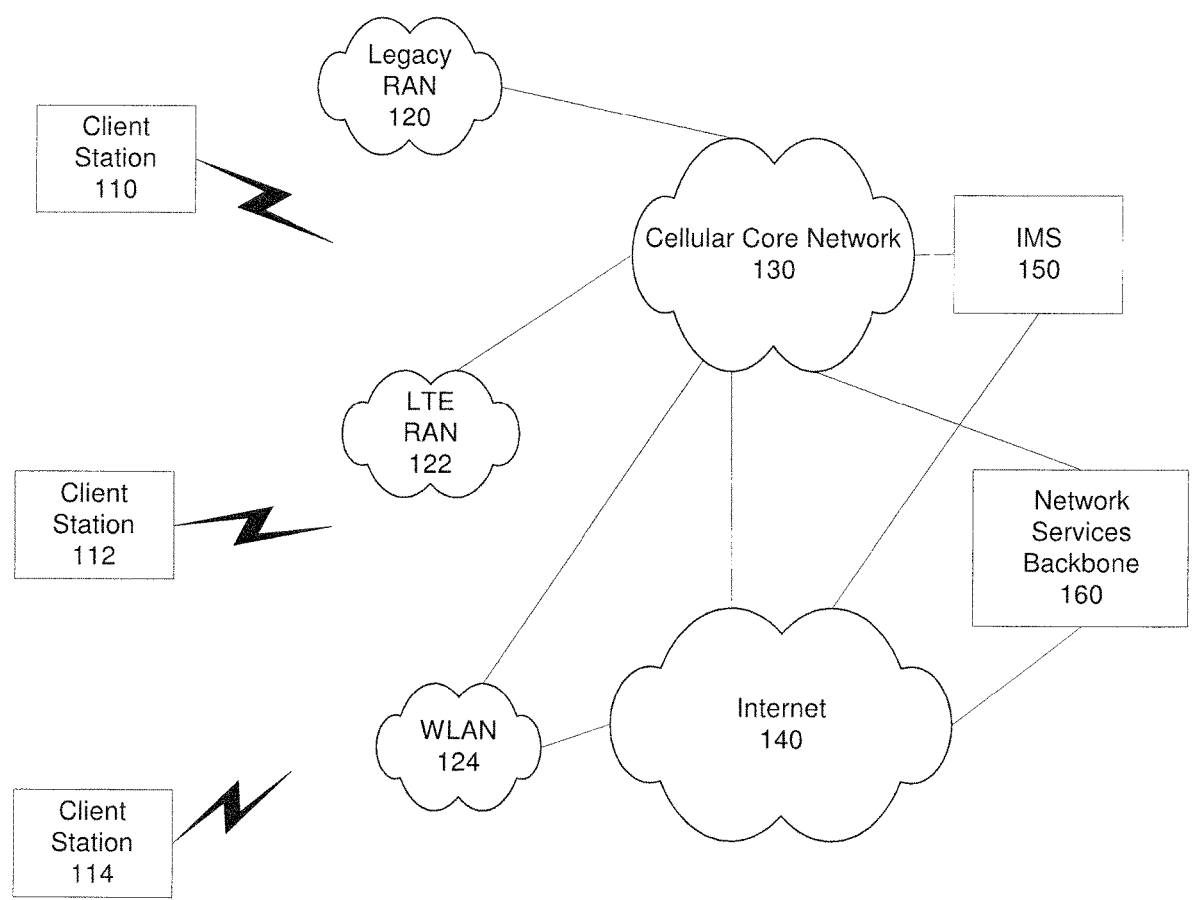
FIG. 1 shows an exemplary network arrangement.

The exemplary embodiments may be further understood with reference to the following description and the related appended drawings, wherein like elements are provided with the same reference numerals. The exemplary embodiments are related to apparatuses, systems and methods for providing telephony services over WiFi for a WiFi capable, non-cellular client station using an existing telephony network. Specifically, a telephony application may be utilized by the client station in which a registration process may be performed to utilize the existing telephony network. In addition, multiple secondary stations may be associated with a primary station and a user may receive incoming calls or originate outgoing calls on one or more of the primary and secondary stations.

FIG. 1 shows an exemplary network arrangement 100. The exemplary network arrangement 100 includes client stations 110-114. In this example, it is assumed that the client stations 110-114 are associated with a single user. For example, the client station 110 may be the user's mobile phone, the client station 112 may be the user's tablet computer and the client station 114 may be the user's desktop computer. Those skilled in the art will understand that, in addition to the examples provided above, the client stations may be any type of electronic component that is configured to communicate via a network, e.g., smartphones, phablets, embedded devices, wearables, etc. It should also be understood that an actual network arrangement may include any number of client stations associated with any number of users and that the user may be associated with more or less client stations. The example of three (3) client stations associated with one (1) user is only provided for illustrative purposes.

Each of the client stations 110-114 may be configured to communicate directly with one or more networks. In this example, the networks with which the client stations 110-

114 may communicate are a legacy radio access network (RAN) 120, a Long Term Evolution radio access network (LTE-RAN) network 122 and a wireless local area network (WLAN) 124. In this example, each of the networks 120-124 is a wireless network with which the client stations 110-114 may communicate wirelessly. However, it should be understood that the client stations 110-114 may also communicate with other types of networks using a wired connection. It should also be understood that not all of the client stations 110-114 may communicate directly with each of the networks 120-124. For example, the client station 114 may not have an LTE chipset and therefore may not have the ability to communicate with the LTE-RAN 122. Again, the use of three (3) networks is only exemplary and there may be any other number of networks with which the client stations 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from client stations that are equipped with the appropriate cellular chip set. Examples of the legacy RAN may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the client stations 110-114 using the IP protocol. The IMS 150 may include a variety of components to accomplish this task. For example, a typical IMS 150 includes an HSS server that stores subscription information for a user of the client stations 110-114. This subscription information is used to provide the correct multimedia services to the user. Other exemplary components of the IMS 150 will be described below, as needed. The IMS 150 may communicate with the cellular core network 130 and the Internet 140 to provide the multimedia services to the client stations 110-114. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the client stations 110-114 to perform functionalities generally associated with computer and cellular networks. For example, the client stations 110-114 may perform voice calls to other parties, may browse the Internet 140 for information, may stream multimedia data to the client devices 110-114, etc.

However, as described above, not every client station 110-114 may have the same communication capabilities with the networks 120, 122, 124, 130, 140. This lack of communication with one or more of the networks may be due to the capabilities of the client device 110-114, e.g., the client device does not include a cellular chip, or may be due to a limitation of the network, e.g., a cellular network does not have a base client station within range of the client station. This lack of communication with one or more networks may result in the client station being unable to avail itself of the functionalities that are available via one or more of the networks.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the client stations 110-114 in communication with the various networks. These extensions may include the functionalities to which the client device 110-114 does not have access because of limitations of the device and/or network, some examples of which were described above. The network services backbone 160 interacts with the client devices 110-114 and/or the networks 120, 122, 124, 130, 140 to provide these extended functionalities.

The network services backbone 160 may be provided by any entity or a set of entities. In one example, the network services backbone 160 is provided by the supplier of one or more of the client stations 110-114. In another example, the network services backbone 160 is provided by the cellular network provider. In still a further example, the network services backbone 160 is provided by a third party unrelated to the cellular network provider or the supplier of the client stations 110-114.

The exemplary embodiments described herein provide an example of different types of functionalities that may be extended to a client station 110-114 and also provide an example of components and services that may be included in the network services backbone 160. In this example, the network services backbone 160 is used to provide cellular services for client stations 110-114 that do not have cellular capabilities. However, it should be understood that the network services backbone 160 may include many other components and services that may be used to enhance the operations of the client stations 110-114 and networks.

One of the services provided by the network services backbone 160 may be to store and update associations among the different client stations 110-114. As described above, in this example, each of these client stations 110-114 are associated with the same user. Thus, the network services backbone 160 may store information that indicates this association of the user with each of the client stations 110-114 and may then also store (or link) the relationship of the client stations 110-114 with each other based on their association with the user. This association among client stations 110-114 may be used as one of the bases for the network services backbone 160 to provide the enhanced operations of the client stations 110-114.

A client station (e.g., client stations 110-114) may be equipped with components that enable a variety of applications to be executed. For example, the client station may be enabled to perform WiFi functionalities. As described above, a WiFi network and associated WiFi functionalities are associated with a connection through a WLAN 124. Thus, throughout this description, the term WiFi should be understood to include any type of WLAN. Accordingly, the client station may connect to a broadband network in order for data to be transmitted/received. If the client station is also configured with components that enable cellular functionalities, telephony functionalities may also be performed. However, if the client station does not have such components or is not configured to perform such functionalities, the client station may be incapable of utilizing an existing telephony network (e.g., Legacy RAN 120 or LTE-RAN 122). The exemplary system and method provide a client station that is WiFi capable but cellular incapable to perform telephony functionalities over an existing telephony network.

Figure 2:
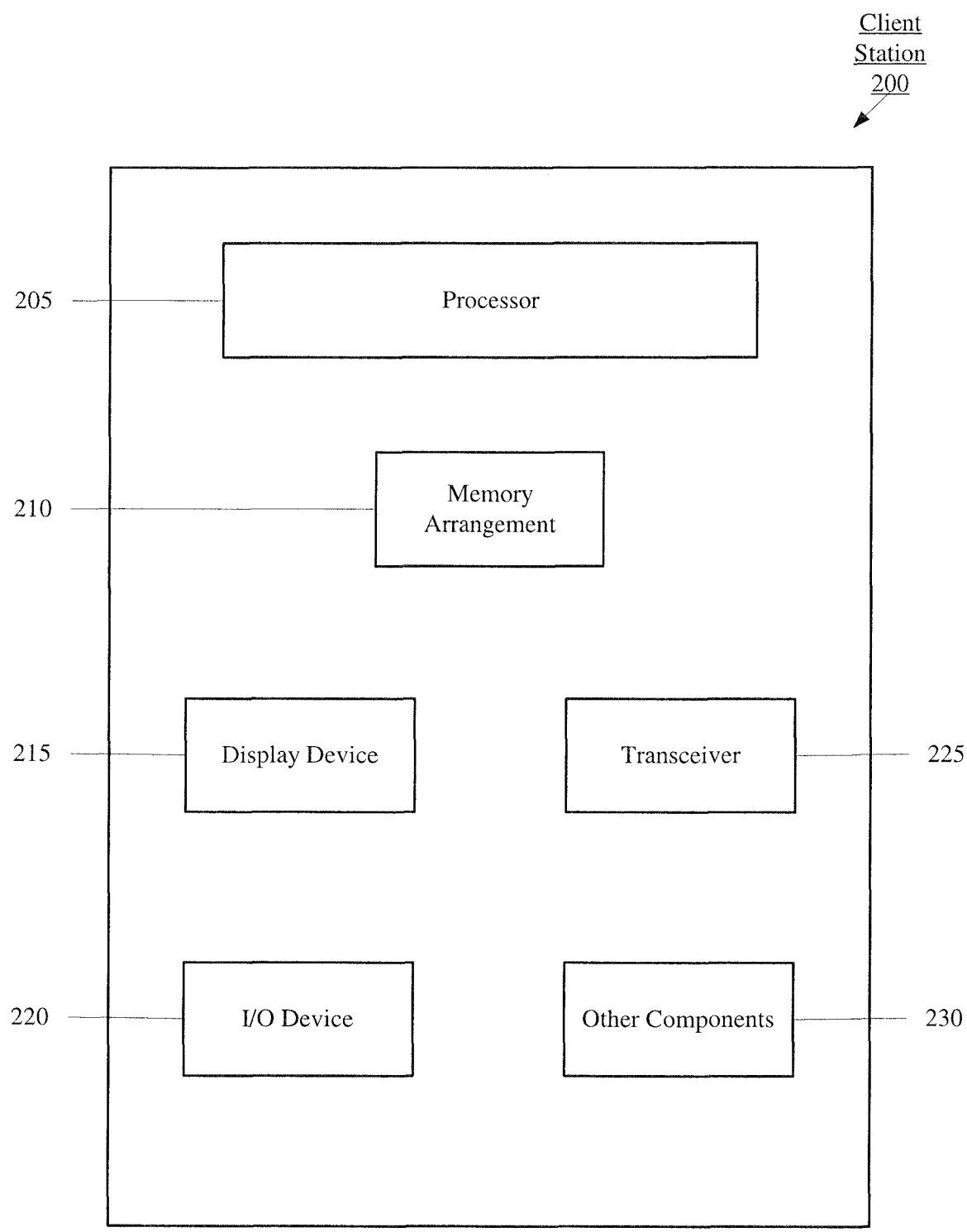
FIG. 2 shows an exemplary client station configured with WiFi functionalities.

FIG. 2 shows an exemplary client station 200 configured to execute a telephony application over an existing telephony network. The client station 200 may represent any electronic device that is configured to perform wireless functionalities and may be representative of one or more of the client stations 110-114. For example, the client station 200 may be a portable device such as a tablet, a laptop, etc. In another example, the client station 200 may be a client stationary device such as a desktop terminal. The client station 110 may be configured to perform WiFi functionalities. However, the client station 200 is not configured to perform cellular functionalities. Specifically, the client station 200 may not be equipped with cellular components or the cellular functionality may be disabled on the client station 200. The client station 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the client station 200 to other electronic devices, etc.

The processor 205 may be configured to execute a plurality of applications of the client station 200. For example, the applications may include a web browser when connected to a communication network via the transceiver 225. In a specific embodiment, the processor 205 may execute a telephony application that enables the client station 200 to perform a telephony functionality. The memory 210 may be a hardware component configured to store data related to operations performed by the client station 200. Specifically, the memory 210 may store data related to the telephony application. The types of data related to the telephony application will be described in further detail below. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to a WiFi network. Thus, an antenna (not shown) coupled with the transceiver 125 may enable the transceiver 225 to operate on a WiFi frequency band. However, if the client station is not a cellular device, the antenna may not enable the transceiver 225 to operate on a cellular band.

Figure 3:
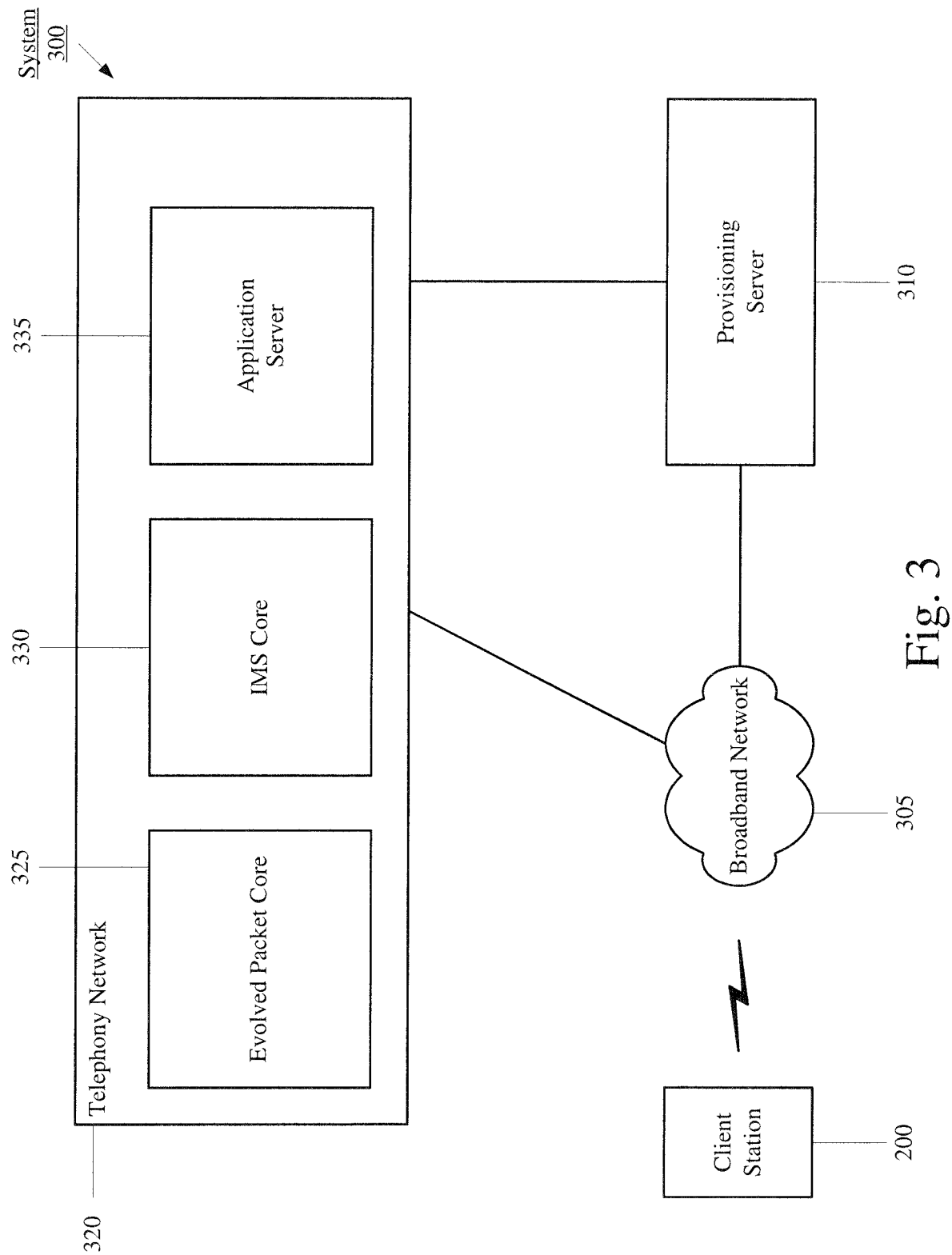
FIG. 3 shows an exemplary system for providing telephony services to the client station of FIG. 2.

FIG. 3 shows an exemplary system 300 for providing telephony services to the client station 200 of FIG. 2. The system 300 illustrates a manner in which the client station 200 that is WiFi capable but cellular incapable is still able to utilize an existing telephony network 320 using its WiFi capability. The system 300 includes the client station 200 configured to communicate via WiFi over a broadband network 305, a provisioning server 310, and the telephony network 320. It should be noted that the telephony network 320 may be configured as an Interworking Wireless Local Area Network (I-WLAN) such that cellular network signaling may be rerouted through WiFi access networks.

Referring back to FIG. 1, the components that are shown in FIG. 3 are also part of the network arrangement 100 shown in FIG. 1. The relationship between these components and the network arrangement 100 will be described. The client station 200 may be any of client stations 110-114. The broadband network 305 may be the WLAN 124 or a combination of the WLAN 124 and the Internet 140. The telephony network 320 and components 325, 330, 335 may be the cellular network comprising the Legacy RAN 120 and/or LTE-RAN 122 and the cellular core network 130. It should be noted that the IMS core 330 is shown as part of the telephony network 320. As described above, the IMS Core 330 may be provided by the cellular provider or a third party and therefore, may reside inside or outside the telephony network 320. In this example, the IMS Core 330 resides within the telephony network. The provisioning server 310 may be a components of the network services backbone 160.

Continuing with the description of the system 300 of FIG. 3, the client station 200 may communicate with other components via the broadband network 305. Since the client station 200 is WiFi capable, the client station 200 may connect to any WiFi network such as the broadband network 305. For example, the WiFi network may be a HotSpot network or a private network in which a server (not shown) or other network component provides an operating area. When the client station 200 is disposed within the operating area, the client station 200 may connect to the broadband network 305. Through the broadband network 305, the client station 200 may communicate with the provisioning server 310.

The provisioning server 310 may be a component of the network services backbone 160 that provides a variety of services to the client station 200. For example, the provisioning server 310 may have a database of applications that may be installed on the client station 200. The applications may be for a variety of different functionalities such as multimedia, entertainment, communication, etc. A specific application that the provisioning server 310 may provide to the client station 200 is the telephony application. Thus, the client station 200 may request to download the telephony application (or an installation file thereof) from the provisioning server 310. As described above, the network services backbone 160 may be provided by any number of entities. In this example, it may be considered that the provisioning server 310 may be a network component of a general service provider of the client station 200. The provisioning server 310 may be configured for a specific purpose such as one described in further detail below. Accordingly, the general service provider of the client station 200 may include a further network component or applications server that handles all requests for available applications from the client station 200. It should be noted that the functionality of the provisioning server 310 may be provided as a hosted service on a cloud infrastructure.

It should be noted that the description below in which the client station 200 transmits/receives data may assume that the client station 200 has successfully established a connection with the broadband network 305. It should also be noted that the client station 200 may communicate with the provisioning server 310 after a user of the client station 200 has provided login credentials. Accordingly, the provisioning server 310 may be aware of the user and any subscription information related to the user.

Upon receiving the telephony application from the provisioning server 310, the client station 200 may execute the telephony application. The telephony application may initiate with a first step of a registration process. The first step of the registration process may include a user of the client station 200 providing various inputs such as registration data (e.g., user name, user address, payment information, etc.). Upon completion of receiving these inputs at the client station 200, the telephony application may transmit the registration data to the provisioning server 310 (via the broadband network 305).

When the provisioning server 310 has received the registration data, the provisioning server 310 may continue the first step of the registration process by transmitting activation data to the telephony network 320. Specifically, the provisioning server 310 may communicate with an application server 335 of the telephony network 320. The application server 335 may provide a variety of functionalities for the telephony network 320 such as voice functionalities, video functionalities, SMS functionalities, MMS functionalities, VVM functionalities, etc. The application server 335 may specifically include an operations support system (OSS) and/or a base station subsystem (BSS). The activation data may include relevant information from the registration data. In particular, the activation data may include an X.509 certificate and an access token. The X.509 certificate is an ITU-T standard for a Public Key Infrastructure (PKI) and Privilege Management Infrastructure (PMI). The X.509 certificate may specify, for example, standard formats for public key certificates, certificate revocation lists, attribute certificates, certification path validation algorithms, etc. This information in the X.509 certificate may be based upon the registration data of the user. The access token may be data including security information for a login session that identifies a user and other related information for the user. The access token may also be temporally based such that a new access token may be required after a predetermined amount of time.

It should be noted that the telephony network may include more than one application server 335. Furthermore, the application server 335 may include an AAA functionality that assists in authentication, authorization, and accounting functionality. Specifically, a trust relationship may be established between the telephony network 320 and the provisioning server 310. Therefore, communications between the telephony network 320 and the provisioning server 310 may be secured (e.g., encrypted).

After the application server 335 of the telephony network 320 receives the activation data from the provisioning server 310, the telephony network 320 generates telephony data for the user. For example, a telephone number may be assigned to the user. The telephony data and associated data may be stored in an IP Multimedia Subsystem (IMS) Core 330. Specifically, the IMS Core 330 may include a Home Subscriber Server (HSS) that is a database of subscription related information. The HSS server may store subscription information once the user is authorized for the service. As described above, the IMS Core 330 may include a variety of other components, select ones of which will be described in further detail below. The telephony data may subsequently be transmitted from the application server 335 upon receiving this data from the IMS core to the provisioning server 310.

After the provisioning server 310 has received the telephony data from the application server 335 of the telephony network 320, the provisioning server 310 transmits this data to the client station 110. The provisioning server 310 may also transmit an indication that the first step of the registration process has been successful. Accordingly, the client station 300 may receive the X.509 certificate, a Carrier Evolved Packet Data Gateway (ePDG), IMS configurations, the associated telephone number with the user, etc.

The above steps describe how the first step of the registration process is completed. That is, the first step of the registration process relates to what is required from the user of the client station 300 such that the provisioning server 310 performs background processes. Accordingly, the user may only have an indirect relationship established with the telephony network 320 via a direct relationship with the provisioning server 310. It should be noted that if the telephony application includes a subscription-type plan in which payments are due for usage, the above-described relationships may allow for the user to only be responsible to the provisioning server 310 while the provisioning server 310 handles all background responsibilities, particularly with a provider of the telephony network 320.

In a second step of the registration process, the client station 200 may transmit the telephony data including the X.509 certificate to the telephony network 320 via the broadband network 305 to setup a VPN tunnel with the telephony network 320. Specifically, the ePDG acts as the VPN gateway to the carrier network. Prior to requesting any carrier service, the client station 200 may establish an IPsec tunnel with the ePDG using the X.509 certificate based upon credentials and once the tunnel is established, the client station 200 may send the telephony data using the newly established tunnel.

The telephony data may be transmitted from the client station 200 to an evolved packet core (EPC) 325 of the telephony network 320 using, for example, a I-WLAN setup. As part of the I-WLAN setup, the client station 200 establishes an IKEv2 tunnel with the ePDG. Once a security tunnel is established between the client station 200 and the telephony network 320, the client station 200 is able to securely send other signaling messages (e.g., SIP registration) over the secure tunnel to the telephony network 320. Those skilled in the art will understand that the EPC 325 may include a variety of components, select ones of which will be described in further detail below.

As discussed above, the telephony data transmitted from the provisioning server 310 to the client station 200 may include the carrier ePDG. Accordingly, the ePDG of the EPC 325 may receive the telephony data from the client station 200. The telephony data may include the X.509 certificate, the user identity, additional security credentials required to setup IKEv2 tunnel, etc. The telephony data may also include the access token for the session currently in progress. The EPC may also include a PDN Gateway (PGW) such that the access token is forwarded to the IMS Core 330, specifically to a proxy call session control function (P-CSCF). The P-CSCF of the IMS Core 330 may forward the telephony data (particularly the access token) to an interrogating CSCF (I-CSCF) that forwards the telephony data to a servicing CSCF (S-CSCF) as well as the HSS. The HSS may again communicate with the AAA/OSS/BSS in order to verify the client station 200 that transmitted the access token. That is, the provisioning server 310 may be contacted by the telephony network 320 to verify the authenticity of the access token. If the provisioning server 310 verifies the access token as valid, the second step of the registration process is completed. That is, the client station 200 is verified with the telephony network with the assigned telephone number and all other associated information.

Figure 4:
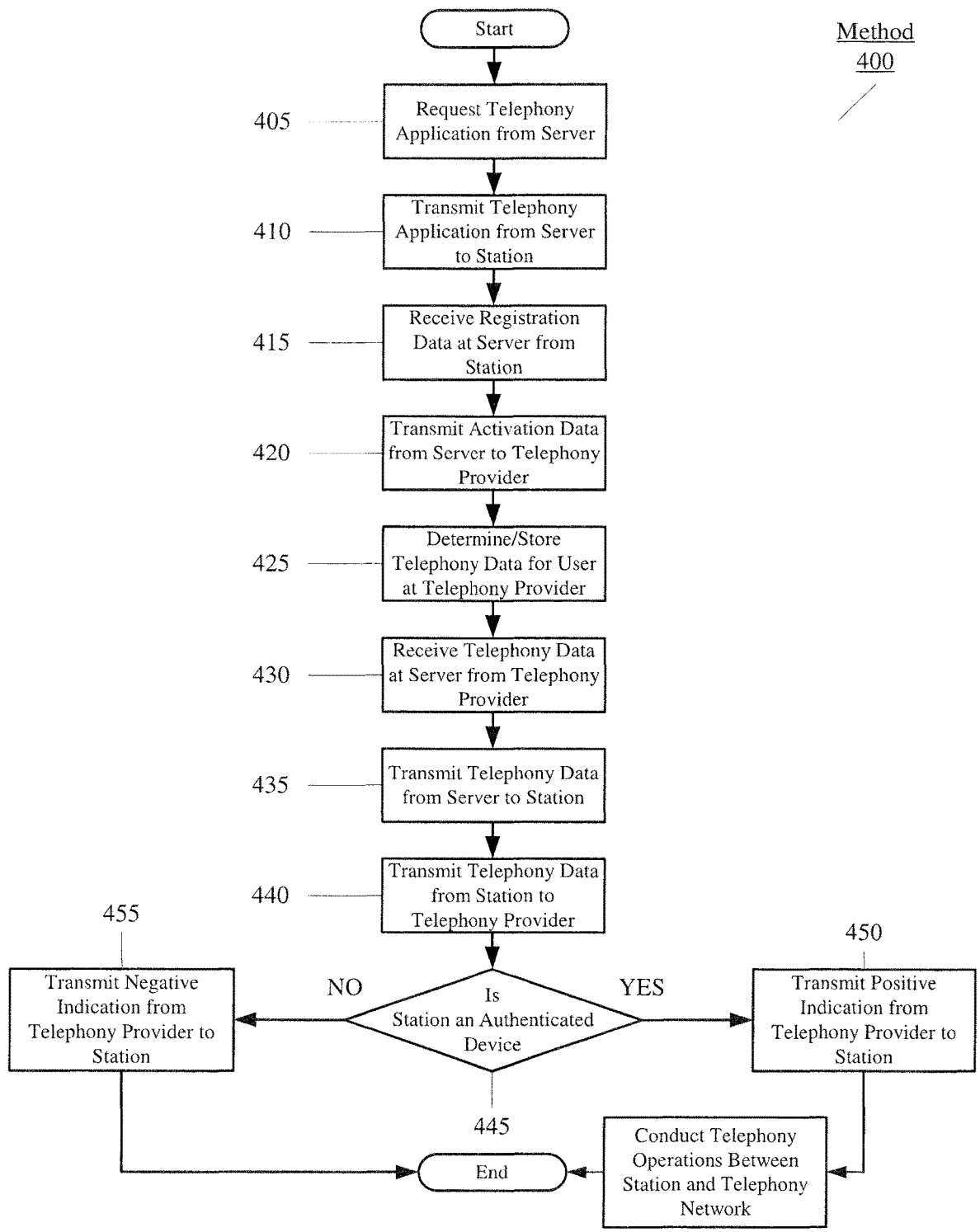
FIG. 4 shows an exemplary method for providing telephony services to the client station of FIG. 2.
Figure 5:
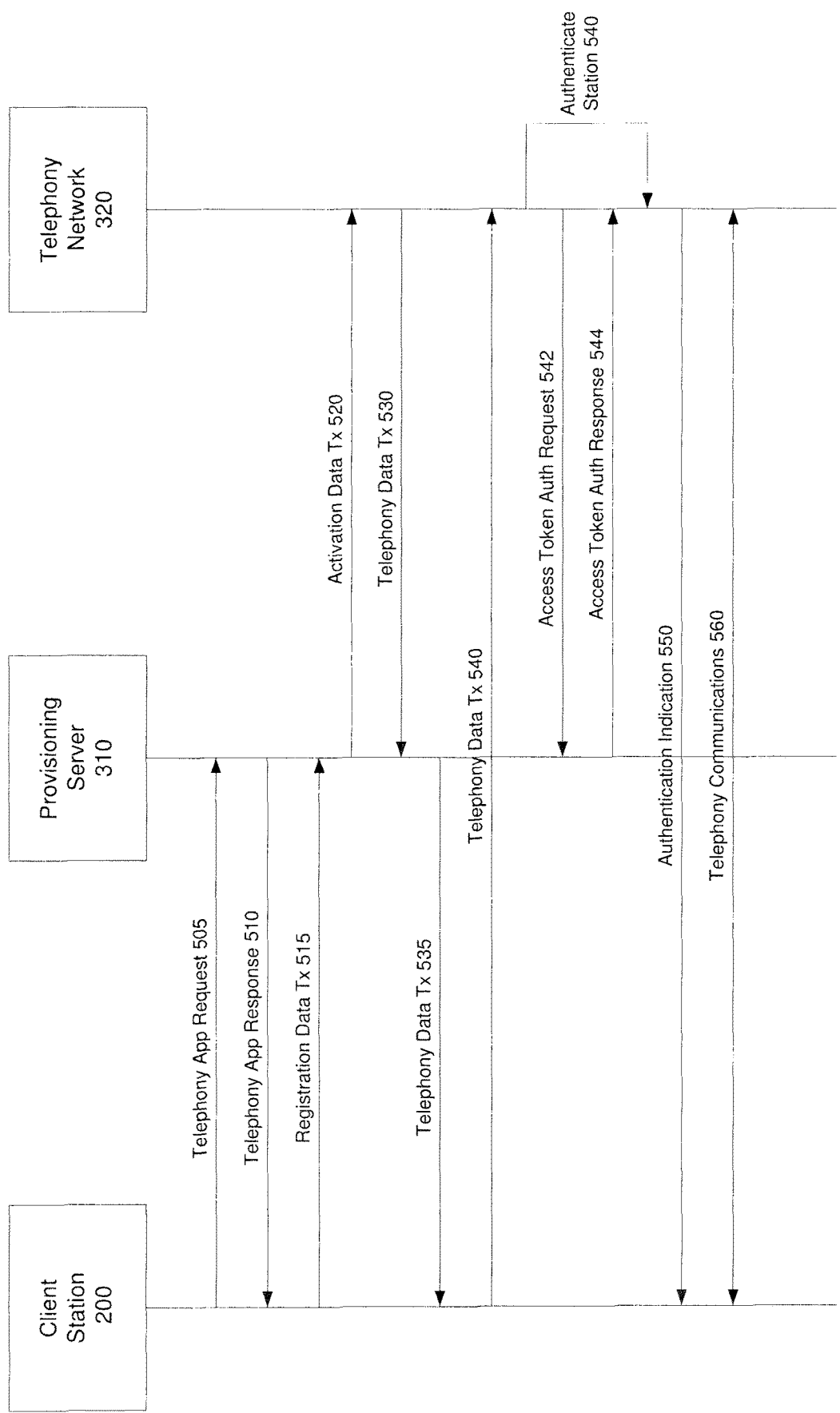
FIG. 5 shows an exemplary signaling diagram for providing telephony services to the client station of FIG. 2.

FIG. 4 shows an exemplary method 400 for providing telephony services to the client station 200 of FIG. 2. The method 400 will also be described in conjunction with the signaling diagram of FIG. 5. In step 405, the client station 200 requests the telephony application from the provisioning server 310. This is shown as request 505 from the client station 200 to the provisioning server 310 in FIG. 5. As described above, the provisioning server 310 may be a component of the network services backbone 160 including a database of applications that may be installed on the client station 200. The telephony application may be one of the applications that is available for the client station 200.

In step 410, the telephony application is provided to the client station 200 from the provisioning server 310. This is shown as the response 510 in FIG. 5. When the client station 200 receives the telephony application and successfully loads the telephony application, the first step of the registration process may be performed. In step 415, the registration data may be sent from the client station 200 to the provisioning server 310. This sending of the registration data is shown as the registration data Tx 515 in FIG. 5. The registration data may include any type of information that a service provider may require to allow a user to use the telephony network, for example, user name, user address, payment information, etc. When the provisioning server 310 has received the registration data, the provisioning server 310 may continue the first step of the registration process by generating activation data. The activation data may include the registration data and any additional data needed by the telephony provider to provide service to the user. The activation data may be encrypted for transmission to the telephony network 320. As described above, the activation data may include an X.509 certificate (e.g., encrypted information based on the registration data) and an access token (e.g., data including security information for a login session that identifies a user and other related information for the user).

In step 420, the activation data is transmitted to the telephony provider 320 from the provisioning server 310. The provisioning server 310 may communicate with an application server 335 of the telephony network 320. This transmission from the provisioning server 310 to the telephony network 320 is shown as activation data Tx 520 in FIG. 5.

In step 425, the telephony data is determined and stored for the user by the telephony provider 320. The telephony data may include any information used by the telephony network to provide the telephony services to the user. For example, a telephone number may be assigned to the user. The telephony data and associated data may be stored in the IMS Core 330. Specifically, the IMS Core 330 may include a Home Subscriber Server (HSS) that is a database of subscription related information. The HSS server may store subscription information once the user is authorized for the service. As noted above, in some implementations, the IMS Core 330 may not be located in the telephony network 320. In such a case, the telephony network 320 may transmit the telephony data to the IMS core 330 for storage and subsequent use. The determination and storage of the telephony data is shown as the determination/storage step 525 in FIG. 5.

In step 430, the telephony data is transmitted from the telephony network 320 to the provisioning server 310. This transmission from the telephony network 320 to the provisioning server 310 is shown as telephony data Tx 530 in FIG. 5. The telephony data is then transmitted from the provisioning server 310 to the client station 200 in step 435. The data received by the client station 200 as part of the telephony data may include the X.509 certificate, a Carrier Evolved Packet Data Gateway (ePDG), IMS configurations, the associated telephone number with the user, etc. This transmission from the provisioning server 310 to the client station 200 is shown as telephony data Tx 535 in FIG. 5. Upon successful receipt of this telephony data by the client station 200, it may be considered that the first step of the registration process is completed.

The second step of the registration process may then be performed. In step 440, the telephony data may be transmitted from the client station 200 to the telephony network 320. This transmission from the client station 200 to the telephony network 320 is shown as telephony data Tx 540 in FIG. 5. In contrast to previous transmissions in this registration process, this transmission from the client station 200 may go directly to the telephony network (e.g., via the broadband network 305) rather than traversing to the provisioning server 310. As described above, the transmission 540 may include the setup of a VPN tunnel with the telephony network 320 using the ePDG that was provided to the client station 200. The client station 200 may establish an IPsec tunnel with the ePDG using the X.509 certificate based upon supplied credentials. When the tunnel is established, Once the and once the tunnel is established, the client station 200 may send the telephony data using the tunnel. The telephony data may be transmitted from the client station 200 to the EPC 325 of the telephony network 320 using, for example, a I-WLAN setup.

In step 445, a determination may be performed whether the client station 200 is an authenticated device using the telephony data including the access token that is transmitted to the telephony network 320. The authentication is shown as authenticate station step 540 in FIG. 5. Specifically, the authentication may include the ePDG of the EPC 325 receiving the telephony data from the client station 200. In addition to the other information described above as being included in the telephony data, the access token for the session currently in progress may also be included. The EPC 325 may also include a PDN Gateway (PGW) that forwards the access token to the IMS Core 330, specifically to a proxy call session control function (P-CSCF). The P-CSCF of the IMS Core 330 may forward the telephony data (particularly the access token) to an interrogating CSCF (I-CSCF) that forwards the telephony data to a servicing CSCF (S-CSCF) as well as the HSS. The HSS may again communicate with the AAA/OSS/BSS in order to verify the client station 200 that transmitted the access token. One of the steps of this authentication process, may include the telephony network 320 send an access token authentication request 542 to the provisioning server 310, which returns an access token authentication response 544 that verifies or denies the identity of the device based on the access token.

If authenticated, in step 350, the telephony network 320 sends a positive authentication indication to the client station 200. The positive authentication indication indicates the second step of the registration process is completed as the client station 200 is verified with the telephony network 320 with the assigned telephone number and all other associated information. If the client station is not properly authenticated, in step 355, the telephony network 320 sends a negative authentication indication to the client station 200 that indicates the second step of the registration process was unsuccessful. This positive or negative indication is shown as authentication indication 550 in FIG. 5.

If the two-step registration process has been successfully completed, the client station 200, in step 460, may transmit and receive calls using the assigned telephone number associated with the user (via first step) as well as the client station 200 (via second step). Specifically, the client station 200, via the broadband network 305, may conduct telephony operations using the telephony network 320. These telephony operations are shown as two way telephony communications 560 in FIG. 5.

The client station 200 may be active for the duration of the access token. Since the access token generally has a related time duration associated therewith, the client station 200 may be authenticated via the access token for only the related time duration. Once the time duration of the access token has expired, the client station 200 may be required to contact the provisioning server 310 via the broadband network 305 to obtain a further access token. This further access token may be utilized to verify the client station 200 using the second registration step described above. The client station 200 may also disconnect from the broadband network 305. For example, the client station 200 may be shut down or moved out of range of the operating area of the broadband network 305. When a connection with the broadband network 305 has been re-established or a connection with a different broadband network is established, the client station 200 may transmit an indication that this connection has been established and/or transmit a request to the provisioning server 310 for the further access token.

Figure 6:
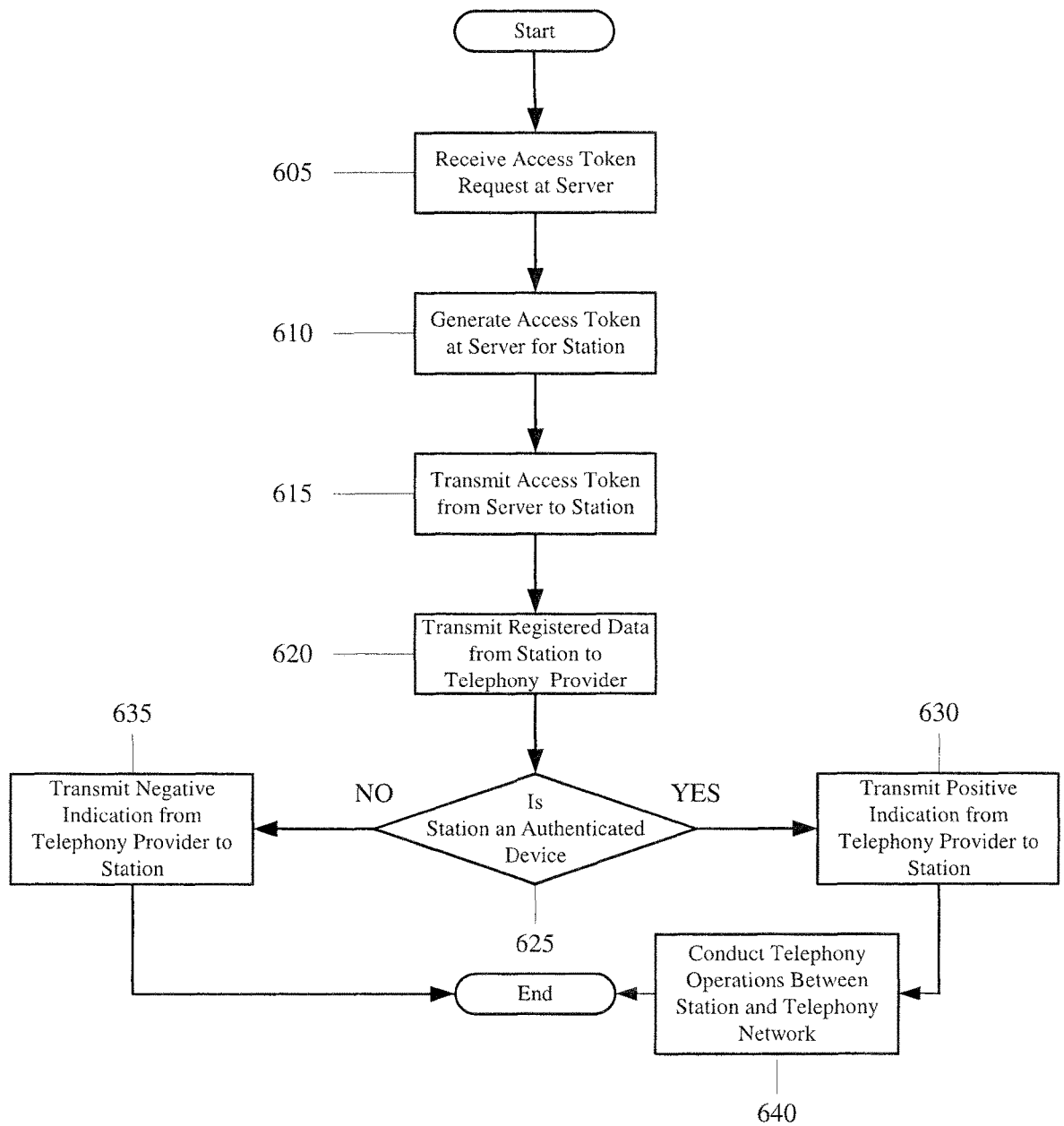
FIG. 6 shows an exemplary method for continuing the providing of telephony services to the client station of FIG. 2.

FIG. 6 shows an exemplary method 600 for continuing the providing of telephony services to the client station 200 of FIG. 2. The method 600 will also be described in conjunction with the signaling diagram of FIG. 7. In step 605, the provisioning server 310 receives request for an access token from the client station 200. This request may include an indication that the client station 200 has re-established a connection with the broadband network 305 or when the client station has established a connection with another WLAN that it may use to communicate with the provisioning server 310. The request may also take the form of a current access token expiring. For example, when a current access token expires, but the client station 200 wants to continue to use the telephony services of the telephony network 320, the client station 200 may send a further access token request to the provisioning server 310. Thus, the provisioning server 310 may receive a request for the further access token. This request from the client station 200 to the provisioning server 310 is shown as access token request 705 of FIG. 7.

In step 610, the provisioning server 310 generates the further access token. As was described above, the provisioning server 310 stores information related to the client station 200. Thus, when the provisioning server 310 receives the request from the client station 200, the provisioning server 310 may access the stored information and generate a further access token in the same manner as was described above for the original access token. The generation of the access token by the provisioning server is shown as generate token step 710 of FIG. 7.

In step 415, the provisioning server 310 transmits the further access token to the client station 200. This transmission is shown as access token response 715 in FIG. 7. In step 620, the client station 200 transmits the telephony data including the further access token to the telephony network 320. This transmission is shown as telephony data Tx 720 in FIG. 7. The step 620 and transmission 720 are substantially similar to the step 440 and transmission 540 described above with reference to FIGS. 4 and 5, respectively. The difference being that the telephony data in step 620 and transmission 720 does not include the original access token, but is rather the further access token.

Figure 7:
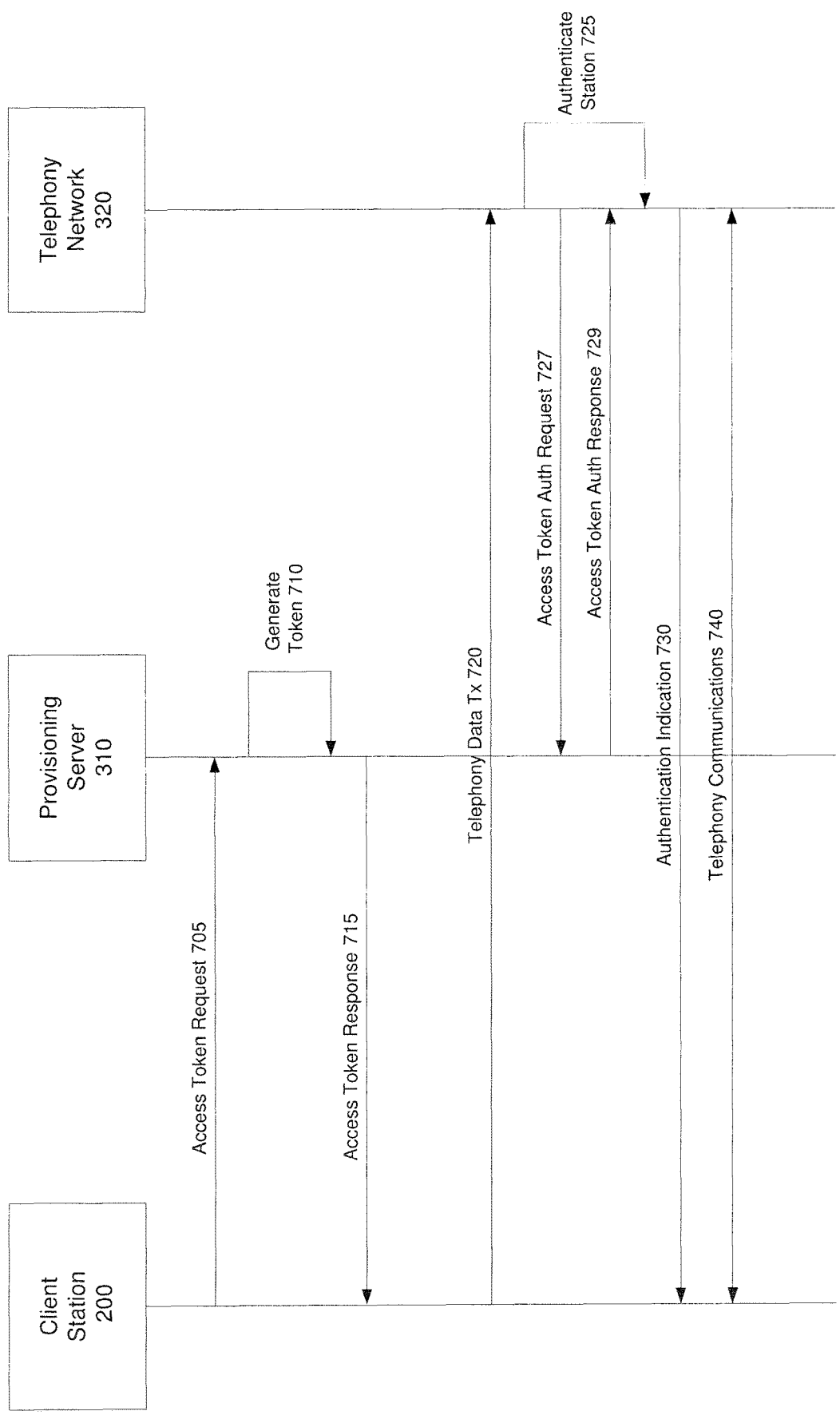
FIG. 7 shows an exemplary signaling diagram for continuing the providing of telephony services to the client station of FIG. 2.

In step 625, a determination is performed to verify that the client station 200 is authenticated. Again, the authentication that is performed in step 625 and corresponding authenticating station step 725 of FIG. 7 is substantially similar to the step 440 and authentication station step 540 of FIGS. 4 and 5, respectively. The difference being that the further access token is used for authentication purposes. Again, the authentication step may include a further access token authentication request 727 from the telephony network 320 to the provisioning server 310 and a corresponding further access token authentication response 729 from the provisioning server 310.

If the client station is authenticated, in step 630, the telephony network 320 sends a positive authentication indication to the client station 200. If the client station is not properly authenticated, in step 635, the telephony network 320 sends a negative authentication indication to the client station 200 that the registration process using the further access token was unsuccessful. This positive or negative indication is shown as authentication indication 730 in FIG. 7.

If the registration process using the further access token has been successfully completed, the client station 200, in step 640, may transmit and receive calls using the assigned telephone number via the broadband network 305 and the telephony network 320. These telephony operations are shown as two way telephony communications 740 in FIG. 7.

It should be noted that the use of I-WLAN and the manner of utilizing an existing telephony network may include further features. For example, multiple devices may be registered with a telephone number assigned to a single user. The user may have multiple client stations associated therewith. As described above, the client stations 110-114 of FIG. 1 may be associated with a single user and the network services backbone 160 may store this association with the user and among the client stations. Accordingly, in this example, the user may select to utilize the telephony application with each of these client stations 110-114. So long as the client stations are connected to the broadband network, an incoming call to the assigned telephone number may activate the telephony application on all active client stations (e.g., activate a ring tone to indicate the incoming call). In another example, the user may have a client station that is associated with a cellular network (e.g. client station 110 includes a cellular chip set that allows the client station to communicate directly with the telephony network 320 via the legacy RAN 120 or LTE-RAN 122). This cellular client station may be associated with the user and also to the assigned telephone number (e.g., in the same manner at the network services backbone 160). Accordingly, the incoming call may also activate the cellular client station whether the telephony application is installed thereon or not.

The exemplary embodiments provide a system and method of providing telephony services over an existing telephony network to a WiFi capable, cellular incapable client station. Using a two step registration process, a user and the client station of the user may utilize the existing telephony network to perform the telephony services. Specifically, in a first step of the registration process, registration data may be transmitted from the client station to a provisioning server. The provisioning server may generate activation data such as a certificate that is transmitted to a component of the telephony network that generates telephony data based upon the activation data. The telephony data may include, for example, an assigned telephone number. Upon receiving the telephony data by the provisioning server, the telephony data may be transmitted to the client station. In a second step of the registration process, the client station 100 110 may transmit the telephony data including the certificate to the telephony network in order to associate the client station with the assigned telephone number. Once the telephone network has verified the client station, the client station may perform the telephony services over the existing telephony network over WiFi.

Figure 8:
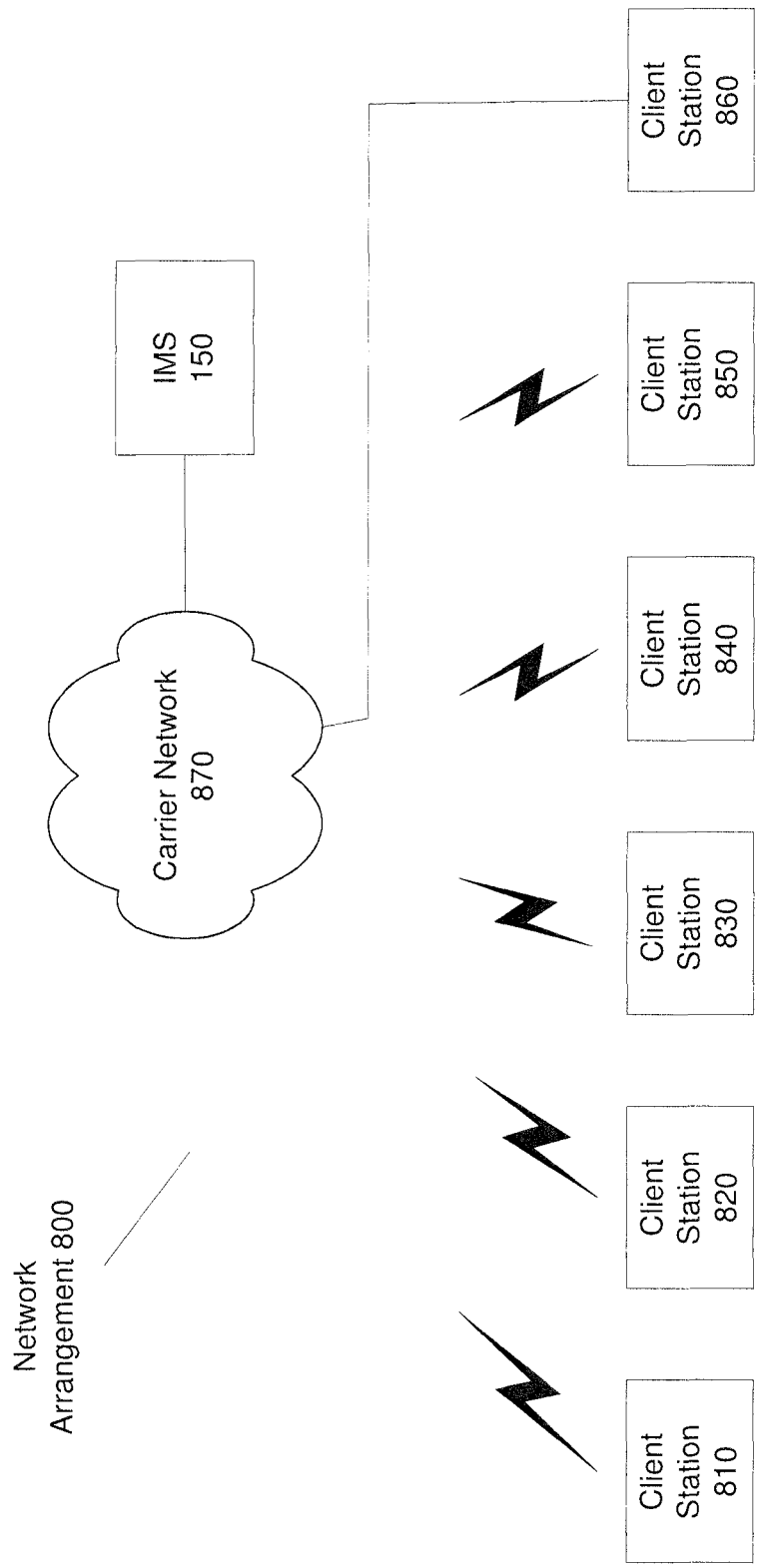
FIG. 8 shows a further exemplary network arrangement.

FIG. 8 shows a further exemplary network arrangement 800. The network arrangement 800 is similar to the network arrangement shown in FIG. 1. Thus, some of the description of the network arrangement 800 may refer back to the components described for the network arrangement shown in FIG. 1. In the network arrangement 800, there are six (6) client stations 810-860 that may be connected to a carrier network 870. In this example, it may be again be considered that all of the client stations 810-860 are associated with a single user. The carrier network 870 may be considered to include all or a portion of the functionalities and components of legacy RAN 120, LTE-RAN 122, cellular core network 130, and network services backbone 160 that were described with reference to FIG. 1. In addition, the carrier network 870 may also be considered to include the functionality of WLAN 124 and the Internet 140, e.g., allows stations that are not cellular equipped to connect to the cellular core network 130. The network arrangement 800 also shows that the carrier network 870 has access to the IMS 150 for which the functionalities were described above.

In this example, it may be considered that the client station 810 is primary device. A primary device is one that has cellular capabilities and has connected to the carrier network 870 via a cellular connection, e.g., the client station 810 is connected to the cellular core network 130 via the LTE-RAN 122. The client station 810 may also be designated as the primary device because it is the device that is associated with the user's subscription to the carrier network. In one example, the client station 810 may be a cellular equipped smartphone (e.g., an iPhone).

The client stations 820-860 may be considered secondary devices. The secondary devices may be cellular equipped, but are not required to be cellular equipped because the client stations 820-860 may also connect to the carrier network 870 via non-cellular connection components and methods. For example, the client station 820 may be a WiFi and cellular equipped tablet device (e.g., an IPad) that in this example is connected to the carrier network 870 via a WiFi connection, e.g., via the WLAN 124 and Internet 140. The client station 830 may be a WiFi equipped tablet device (e.g., an IPad Mini), the client station 840 may be a WiFi equipped laptop computer (e.g., a MacBook Air) and the client station 850 may be a WiFi equipped multimedia device (e.g., an IPod Touch), each of which are connected to the carrier network 870 via a WiFi connection. The client station 860 may be a desktop computer (e.g., an iMac) that is connected via a wired connection to the Internet 140 and through to the carrier network 870.

As described above, one of the services provided by the network services backbone 160 may be to store and update associations among the different client stations 810-860. In this example, each of these client stations 810-860 is associated with the same user. The network services backbone 160 may also store information indicating which client stations 810-860 are primary devices and secondary devices. As also described above, the exemplary embodiments allow any of the client stations 810-860 to receive or originate voice calls via the carrier network 870. Part of this functionality is based on each of the client stations 810-860 registering with the IMS 150 such that the IMS 150 will know the current IP address and the identification of the each of the client stations 810-860.

However, an implication of the exemplary embodiments is that a virtually unlimited number of phone calls may be handled by a single line of an account or subscription. For example, it may be considered that a user has subscribed to the carrier network 870 using the primary device client station 810 and has received a phone number associated with the single line of the account. The user has also associated the client stations 820-860 with the account. If it is considered that each device is capable of handling 3 simultaneous calls, in the network arrangement 800, the user may have 18 active calls (6 devices×3 calls on each device) associated with the single line of the account. Since there may be no limit to the number of secondary devices, the user could theoretically associate any number of secondary devices and extend the number of active calls. This could also lead to abuses such as the user allowing family or friends to associate their devices as secondary devices when they want to originate a call.

While the provider of the carrier network 870 wants to provide users with high quality services such as allowing the user to receive/originate voice calls on multiple device, the provider also generates revenue by selling more subscriptions, e.g., adding additional lines to a subscription. Thus, the provider desires to provide users with the option of allowing multiple voice calls on a single line, but also to limit this number to a reasonable amount. The exemplary embodiments provide apparatuses, systems and methods to balance these competing concerns of the provider by limiting the number of simultaneous voice calls, but still provide the user with the option of having active calls on more than one device.

The exemplary embodiments implement various rules that are enforced to limit the number of simultaneous calls. The following provides an exemplary list of rules. It should be understood that these rules are only exemplary and other rules may also be implemented by the exemplary embodiments. In a first exemplary rule, the total number of client stations that are associated with an account at any given time may be limited. For example, if the limit is set for six (6), the network arrangement 800 would include the maximum allowable number of client stations 810-860. Those skilled in the art will understand that using a value of six (6) for this rule is only exemplary.

In a second exemplary rule, a maximum number of call legs for each device may be set. In one example, the number may be set to three (3), e.g., one call being active, one call on hold and one call incoming. Those skilled in the art will understand that the voice call software of a device may be programmed to handle any number of calls, e.g., the software may allow any number of calls to be placed on hold.

However, this exemplary rule would limit the total number of call legs for any one device. Those skilled in the art will understand that using a value of three (3) for this rule is only exemplary. It should also be understood that a different value may be set for the primary device and for the secondary devices.

In a third exemplary rule, the primary device (e.g., client station 810) is always able to receive/originate voice calls as long as it is not currently exceeding the maximum number of call legs. In a fourth exemplary rule, only one secondary device (e.g., client stations 820-860) may handle voice calls at a given time. Again, the exemplary embodiments may implement some or all of these rules and may also implement additional rules that limit the number of simultaneous calls being handles by the single line of the account.

The following provides several exemplary scenarios of call handling for the network arrangement 800 based on the implementation of the above exemplary rules. For all the exemplary scenarios, it may be considered that the client station 810 is the primary device, the client stations 820-860 are secondary devices and all of the devices are associated with the same account and are registered with the IMS 150. Each of the exemplary scenarios will also be described with reference to a corresponding state diagram.

Figure 9:
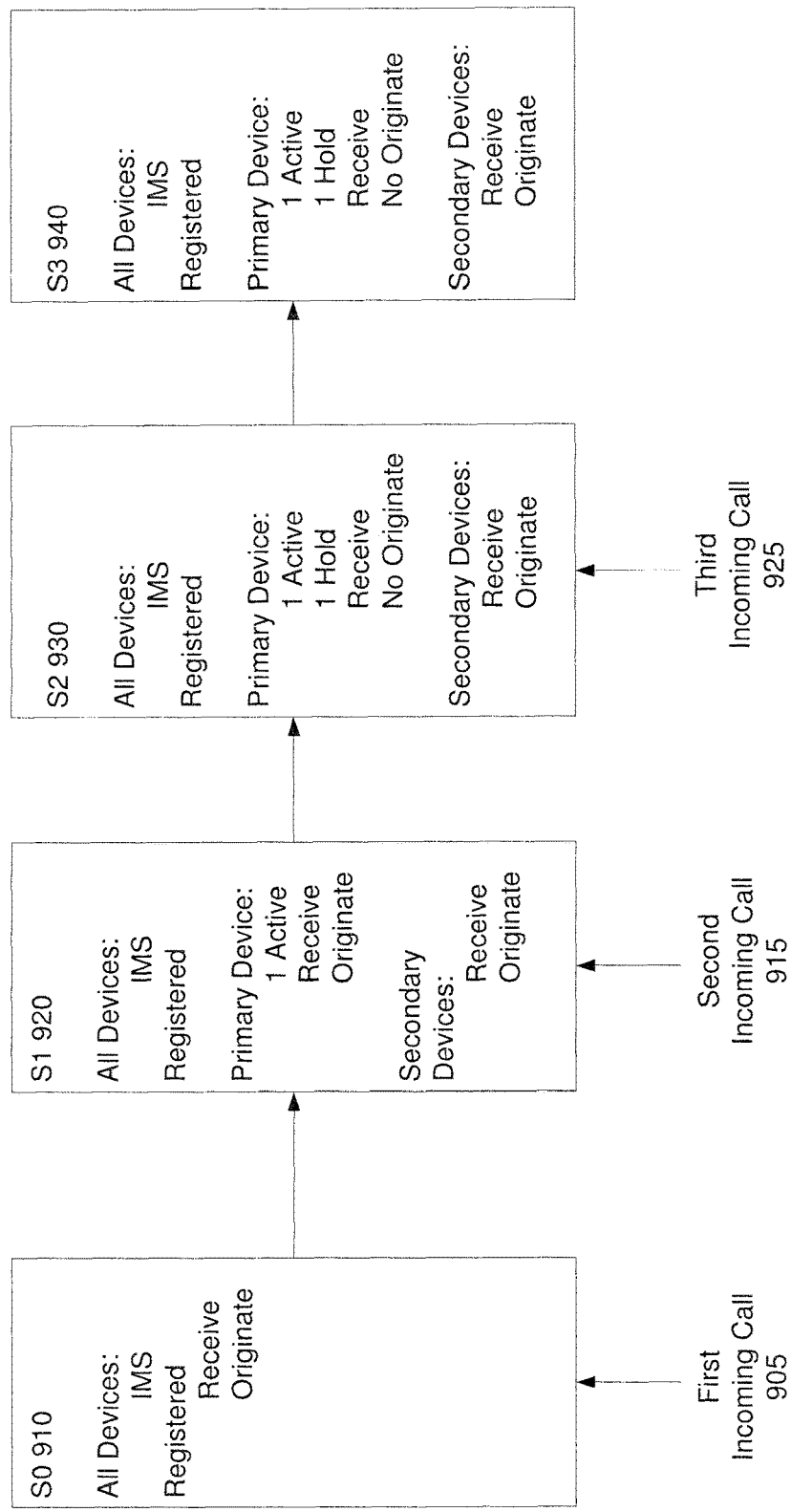
FIG. 9 shows an exemplary state diagram for a first exemplary call flow handling scenario.

FIG. 9 shows an exemplary state diagram 900 for a first exemplary call flow handling scenario. In state S0 910 (initial state), the client stations 810-860 are registered with the IMS 150 and in an idle state where none of the client stations 810-860 are currently engaged on a voice call. When in the state s0 910, any of the client stations 810-860 may originate a voice call or may receive a voice call. Those skilled in the art will understand that one or more of the client stations 810-860 may be engaged in data operations with the carrier network 870 or any other network. The exemplary embodiments do not impact any data operations of the client stations 810-860 as the exemplary embodiments are directed to the handling of voice calls. For the purposes of the exemplary embodiments, VoLTE calls and WiFi calls are considered to be voice calls even though these types of calls may be handled using packet switched techniques. Thus, the term "call" that is used to describe the exemplary scenarios should be understood to mean voice calls.

In addition, throughout this description, it will be described that the carrier network 870 causes one or more of the client stations 810-860 to "ring" when there is an incoming call, e.g., alert the user of the client station to an incoming call. Those skilled in the art will understand that there may be different mechanisms to cause a client station to ring for an incoming call depending on the type of network to which the client station is attached. For example, one manner of causing a client station to ring is based on the Session Initiation Protocol (SIP) where the carrier network 870 will send a SIP invitation to the client station, which, along with other steps, may cause the client station to ring. Thus, throughout this description, the terms "ring" and "invitation" or their variants may be used to describe the situation where the carrier network 870 causes a user of the client stations 810-860 to be alerted to an incoming call.

While in the state S0 910, the carrier network 870 may receive a first incoming call 905 for the account, e.g., a phone call to the phone number associated with the account. As described above, the carrier network 870 is aware that each of the client stations 810-860 are associated with the account, e.g., via the information stored in the network services backbone 160. Since each of the client stations 810-860 is registered with the IMS 150, the carrier network 870 has the information to fork the first incoming call 905 to each of the client stations 810-860 causing each of the client stations 810-860 to ring.

The user may select any of the client stations 810-860 to answer the first incoming call 905. In this first exemplary scenario, the user may select the primary device client station 810 to answer the first incoming call 905, thereby causing the network arrangement 800 to transition to state S1 920. In state S1 920, the primary device client station 810 has one active call (e.g., the first incoming call 905) and the primary device client station 810 may also originate or receive a second voice call because it will not violate the rule that a client station has more than the maximum amount of call legs (e.g., 3). In addition, the secondary device client stations 820-860 remain in the idle state where each of the devices may originate or receive a second voice call because it will not violate any of the exemplary rules.

While in the state S1 920, the carrier network 870 may receive a second incoming call 915 for the account. Since in the state S1 920 each of the client stations 810-860 is capable of receiving the second incoming call 915, the carrier network 870 will again fork the second incoming call 915 to each of the client stations 810-860 causing each of the client stations 810-860 to ring. Those skilled in the art will understand that since client station 810 is currently engaged with the first incoming call 905, the client station 810 will not ring, but will be caused to perform a call waiting function that is equivalent to ringing because it provides the user with a choice to answer the second incoming call 915.

The user may again select any of the client stations 810-860 to answer the second incoming call 915. In this first exemplary scenario, the user may again select the primary device client station 810 to answer the second incoming call 915, thereby causing the network arrangement 800 to transition to state S2 930. In order to answer the second incoming call 915 on the client station 810 that currently has an active call, the client station 810 may place the currently active call (e.g., first incoming call 905) on hold and then answer the second incoming call 915 causing that call to become the active call. Those skilled in the art will understand that there may be various ways of accomplishing this functionality such as by the client station 810 displaying a "Hold and Accept" dialog box that when selected causes the first incoming call 905 to be placed on hold and the second incoming call 915 to become active.

Thus, in state S2 930, the primary device client station 810 has one active call (e.g., the second incoming call 915) and one call on hold (e.g., the first incoming call 905). The primary device client station 810 may also receive a third incoming call because it will not violate the rule that a client station has more than the maximum amount of call legs (e.g., 3). However, the primary device client station 810 will not be able to originate a call because that would cause the primary device client station 810 to violate the exemplary rule that the primary device should always be able to receive a call. For example, if the primary device client station 810 were allowed to originate a third call, the primary device client station 810 would have three call legs and would violate the active leg rule if another incoming call were received. Therefore, when the primary device client station 810 has two active call legs, the primary device client station 810 will be prevented from originating a new call. In addition, in state S2 930, the secondary device client stations 820-860 remain in the idle state where each of the devices may originate or receive a second voice call because it will not violate any of the exemplary rules.

While in the state S2 930, the carrier network 870 may receive a third incoming call 925 for the account. Since in the state S2 930 each of the client stations 810-860 is capable of receiving the third incoming call 925, the carrier network 870 will again fork the third incoming call 925 to each of the client stations 810-860 causing each of the client stations 820-860 to ring and client station 810 to perform the call waiting function.

The user may again select any of the client stations 810-860 to answer the third incoming call 925. In this first exemplary scenario, the user may again select the primary device client station 810 to answer the third incoming call 915, thereby causing the network arrangement 800 to transition to state S3 940. In order to answer the third incoming call 925 on the client station 810 that currently has an active call and a call on hold, the client station 810 has to disconnect one of the currently active call (e.g., second incoming call 915) or the call on hold (e.g., first incoming call 905) and then answer the third incoming call 925 causing that call to become the active call. Those skilled in the art will understand that there may be various ways of accomplishing this functionality such as by the client station 810 displaying a "End and Accept" dialog box that when selected causes the active call (second incoming call 915) to be disconnected and the third incoming call 925 to become active or a "End Hold and Accept" dialog box that when selected causes the call on hold (first incoming call 905) to be disconnected, the currently active call (second incoming call 915) to be placed on hold and the third incoming call 925 to become active. In this first exemplary scenario, it will be considered that the user selected "End and Accept" causing the active call (second incoming call 915) to be disconnected and the third incoming call 925 to become active.

Thus, in state S3 940, the primary device client station 810 has one active call (e.g., the third incoming call 925) and one call on hold (e.g., the first incoming call 905). The state S3 940 is substantially similar to the state S2 930, except that the active call becomes the third incoming call 925 and the second incoming call 915 is disconnected. Thus, the primary device client station 810 may receive a fourth incoming call because it will not violate the rule that a client station has more than the maximum amount of call legs (e.g., 3) because the second the incoming call 915 has been disconnected. Again, as described above, because the primary device client station 810 has two active legs, the primary device client station 810 will not be able to originate a call because that would cause the primary device client station 810 to violate the exemplary rule that the primary device should always be able to receive a call. In addition, in state S3 940, the secondary device client stations 820-860 remain in the idle state where each of the devices may originate or receive another voice call because it will not violate any of the exemplary rules.

Figure 10:
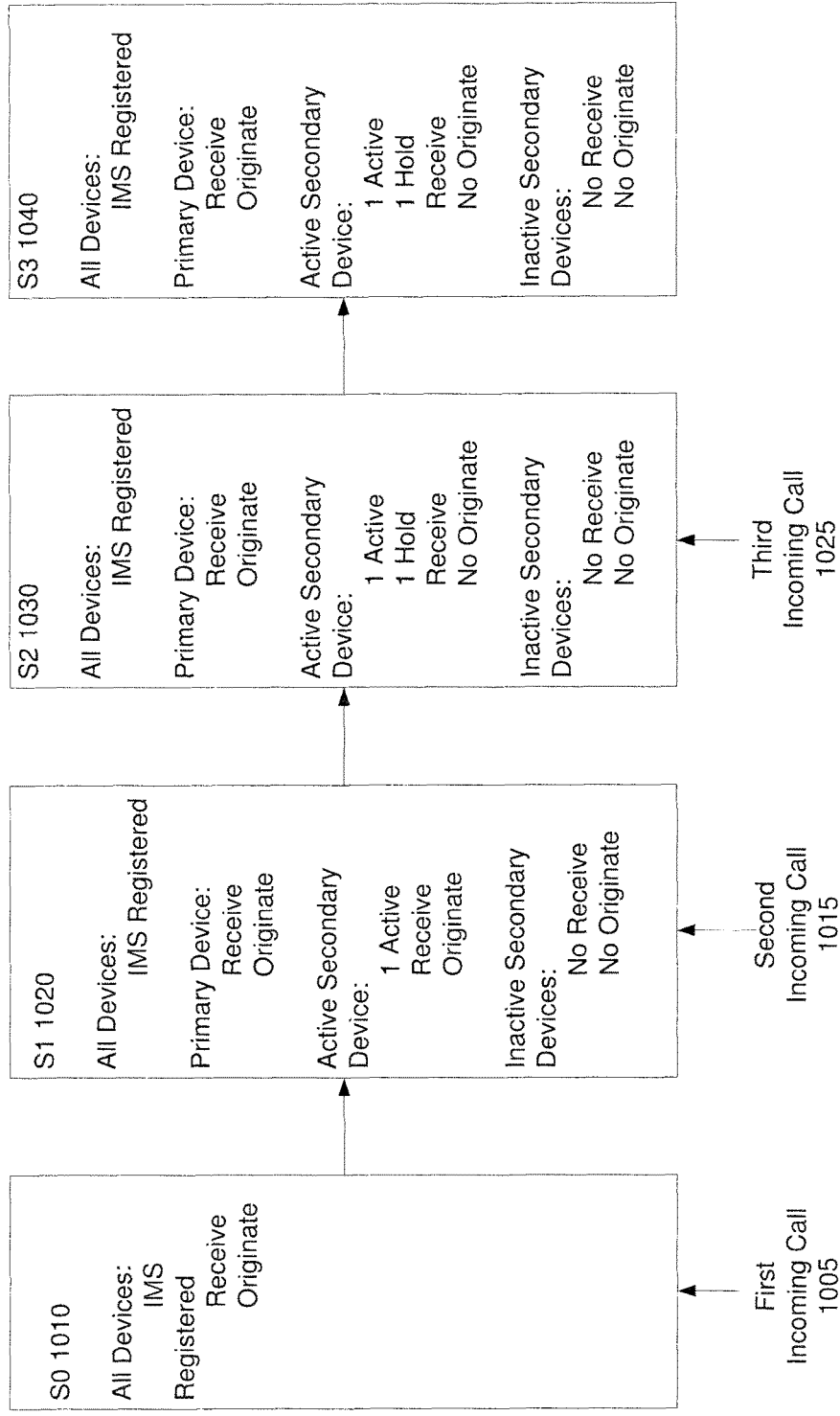
FIG. 10 shows an exemplary state diagram for a second exemplary call flow handling scenario.

FIG. 10 shows an exemplary state diagram 1000 for a second exemplary call flow handling scenario. State S0 1010 is identical to the initial state S0 910 described above with reference to the first exemplary call flow handling scenario, e.g., the client stations 810-860 are registered with the IMS 150, in an idle state where none of the client stations 810-860 are currently engaged on a voice call and may originate or receive a voice call. While in the state S0 1010, the carrier network 870 may receive a first incoming call 1005 for the account and may fork the first incoming call 1005 to each of the client stations 810-860 causing each of the client stations 810-860 to ring.

The user may select any of the client stations 810-860 to answer the first incoming call 1005. In this second exemplary scenario, the user may select the secondary device client station 820 to answer the first incoming call 1005, thereby causing the network arrangement 800 to transition to state S1 1020. In state S1 1020, the primary device client station 810 remains in the idle state where it may originate or receive another voice call because it will not violate any of the exemplary rules. The active secondary device (e.g., client station 820) has one active call (e.g., the first incoming call 1005) and the active secondary device client station 820 may also originate or receive a second voice call because it will not violate the rule that a client station has more than the maximum amount of call legs (e.g., 3).

In state S1 1020, the inactive secondary devices (e.g., client stations 830-860) may neither receive nor originate a second voice call because it will violate the exemplary rule that only one (1) secondary device may be active at any given time. If the user attempts to originate a call on one of the inactive secondary device client stations 830-860, the user will not be able to connect such a call. There may be various mechanisms for disabling the call origination functionality on the inactive secondary device client stations 830-860. In a first example, the carrier network 870, via the IMS 150, will understand that the client station 820 is actively handling a call. As described above, the IMS 150 will have the IP address and identity of the client station 820 and the carrier network 870 or IMS 150 will also include an indication that the client station 820 is a secondary device. Thus, when the carrier network 870 includes indications that the client station 820 is a secondary device and is active, the carrier network 870 may prevent the inactive secondary device client stations 830-860 from originating a call. If one of the inactive secondary device client stations 830-860 attempts to originate a call, the carrier network 870 will send an error message to the secondary device indicating that another secondary device is already in use.

In a second example, when the carrier network 870 becomes aware that a secondary device is active (e.g., in the manner described above), the carrier network 870 may actively send an indication to the inactive secondary device client stations 830-860 indicating that one of the secondary devices has become active. The receipt of this information may cause the inactive secondary device client stations 830-860 to deactivate the call origination functionality until receiving a further indication that the active secondary device has become inactive.

In a third example, when the client station 820 is actively handling a call, this information may be communicated to the network services backbone 160 that stores the associations. Upon receiving this information, the network services backbone 160 may communicate this information to all the associated secondary devices (e.g., the inactive secondary device client stations 830-860), thereby causing the associated secondary devices to deactivate the call origination functionality. When the network services backbone 160 receives further information that the active secondary device has become inactive, this information may be communicated to the associated secondary devices to cause those devices to reactivate the call origination functionality.

While in the state S1 1020, the carrier network 870 may receive a second incoming call 1015 for the account. Since in the state S1 1020 only the client stations 810 and 820 are capable of receiving the second incoming call 1015, the carrier network 870 will fork the second incoming call 1015 to only the client stations 810 and 820 causing the client stations 810 to ring and the client station 820 to perform a call waiting function.

The user may select either client station 810 or 820 to answer the second incoming call 1015. In this second exemplary scenario, the user may again select the active secondary device client station 820 to answer the second incoming call 1015 by placing the currently active call (first incoming call 1005) on hold and answering the second incoming call 1015 to make tha call active. This causes the network arrangement 800 to transition to state S2 1030.

In state S2 1030, the active secondary device client station 820 has one active call (e.g., the second incoming call 1015) and one call on hold (e.g., the first incoming call 1005). The active secondary device client station 820 may also receive a third incoming call because it will not violate the rule that a client station has more than the maximum amount of call legs (e.g., 3). However, the active secondary device client station 820 will not be able to originate a call for the same reasons as described above in state S2 930 for primary device client station 810 having two active call legs.

In addition, in state S2 1030, the primary device client station 810 remains in the idle state where it may originate or receive another voice call because it will not violate any of the exemplary rules. The inactive secondary device client stations 830-860 remain in the same state as when in state S1 1020 where the inactive secondary device client stations 830-860 can neither originate nor receive a voice call because it will violate the rule that only one secondary device may be actively handling a call at a given time.

While in the state S2 1030, the carrier network 870 may receive a third incoming call 1025 for the account. Since in the state S2 1030 only client stations 810 and 820 are capable of receiving the third incoming call 1025, the carrier network 870 will fork the third incoming call 1025 to only the client stations 810 and 820 causing client station 810 to ring and client station 820 to perform the call waiting function.

The user may again select either client station 810 or 820 to answer the third incoming call 1025. In this second exemplary scenario, the user may again select the active secondary device client station 820 to answer the third incoming call 1015 by for example, selecting the "End Hold and Accept" dialog box that when selected causes the call on hold (first incoming call 1005) to be disconnected, the currently active call (second incoming call 1015) to be placed on hold and the third incoming call 1025 to become active. This causes the network arrangement 800 to transition to state S3 1040.

In state S3 1040, the active secondary device client station 820 has one active call (e.g., the third incoming call 1025) and one call on hold (e.g., the second incoming call 1015). The active secondary device client station 820 may also receive a fourth incoming call because it will not violate the rule that a client station has more than the maximum amount of call legs (e.g., 3). However, the active secondary device client station 820 will not be able to originate a call for the same reasons as described above in state S2 930 for primary device client station 810 having two active call legs.

In addition, in state S3 1040, the primary device client station 810 remains in the idle state where it may originate or receive another voice call because it will not violate any of the exemplary rules. The inactive secondary device client stations 830-860 remain in the same state as when in states S1 1020 and S2 1030 where the inactive secondary device client stations 830-860 can neither originate nor receive a voice call because it will violate the rule that only one secondary device may be actively handling a call at a given time.

It should be noted that the first and second exemplary scenarios may be considered exclusive use scenarios, e.g., in the first exemplary scenario, the user selected to use only the client station 810 and in the second exemplary scenario, the user selected to only use the client station 820. The following third exemplary call handling scenario will provide an example of a mixed use, e.g., where the user has selected to simultaneously use multiple client stations.

Figure 11:
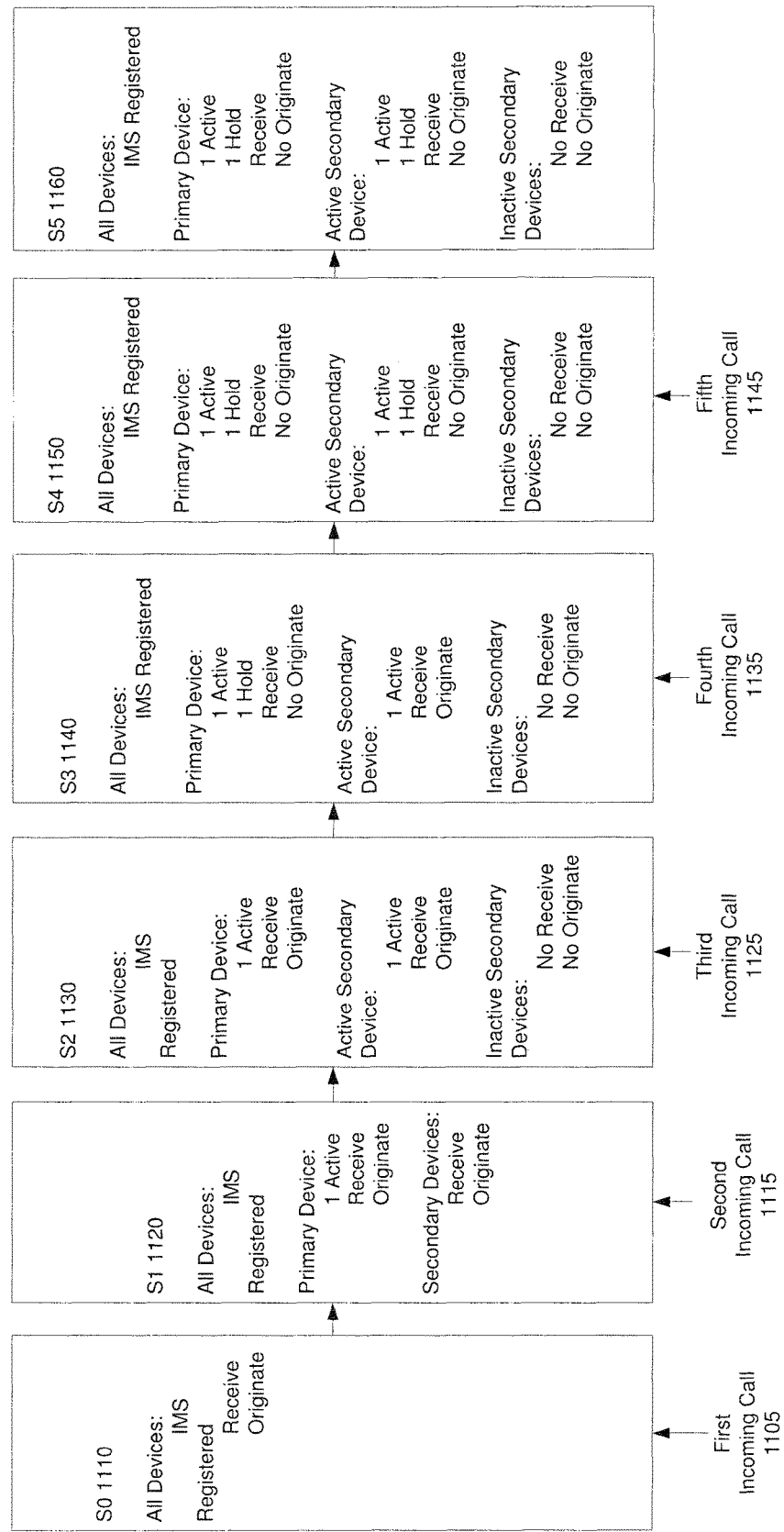
FIG. 11 shows an exemplary state diagram for a third exemplary call flow handling scenario.

FIG. 11 shows an exemplary state diagram 1100 for a third exemplary call flow handling scenario. State S0 1110 is identical to the initial state S0 910 described above with reference to the first exemplary call flow handling scenario, e.g., the client stations 810-860 are registered with the IMS 150, in an idle state where none of the client stations 810-860 are currently engaged on a voice call and may originate or receive a voice call. While in the state S0 1010, the carrier network 870 may receive a first incoming call 1105 for the account and may fork the first incoming call 1105 to each of the client stations 810-860 causing each of the client stations 810-860 to ring.

The user may select any of the client stations 810-860 to answer the first incoming call 1105. In this third exemplary scenario, the user may select the primary device client station 810 to answer the first incoming call 1105, thereby causing the network arrangement 800 to transition to state S1 1120. Since this transition is similar to the transition from state S0 910 to state S1 920 described with reference to FIG. 9, the state S1 1120 is substantially similar to the state S1 920. In state S1 1120, the primary device client station 810 has one active call (e.g., the first incoming call 1105) and the primary device client station 810 may also originate or receive a second voice call. In addition, the secondary device client stations 820-860 remain in the idle state where each of the devices may originate or receive a second voice call.

While in the state S1 1120, the carrier network 870 may receive a second incoming call 1115 for the account. Since in the state S1 1120 each of the client stations 810-860 is capable of receiving the second incoming call 1115, the carrier network 870 will again fork the second incoming call 1115 to each of the client stations 810-860 causing each of the client stations 820-860 to ring and client station 810 to perform a call waiting function.

The user may select any of the client stations 810-860 to answer the second incoming call 1115. In this third exemplary scenario, the user may select one of the secondary device client stations 820-860 (e.g., client station 820) to answer the second incoming call 1115. This causes the network arrangement 800 to transition to state S2 1130. In state S2 1130, the primary device client station 810 has one active call (first incoming call 1105) and may originate or receive a further call because it would not violate any of the exemplary rules. The active secondary device client station 820 has one active call (second incoming call 1115) and may originate or receive a further call because it would not violate any of the exemplary rules. The inactive secondary device client stations 830-860 can neither originate nor receive a voice call because it will violate the rule that only one secondary device may be actively handling a call at a given time.

While in the state S2 1130, the carrier network 870 may receive a third incoming call 1125 for the account. Since in the state S2 1130 only client stations 810 and 820 are capable of receiving the third incoming call 1125, the carrier network 870 will fork the third incoming call 1125 to only the client stations 810 and 820 causing client stations 810 and 820 to perform the call waiting function.

The user may select either client station 810 or 820 to answer the third incoming call 1125. In this third exemplary scenario, the user may select the primary device client station 810 to answer the third incoming call 1115 by for example, selecting the "Hold and Accept" dialog box that when selected causes the currently active call (first incoming call 1105) to be placed on hold and the third incoming call 1125 to become active. This causes the network arrangement 800 to transition to state S3 1140.

In state S3 1140, the primary device client station 810 has one active call (e.g., the third incoming call 1125) and one call on hold (e.g., the first incoming call 1105). The primary device client station 810 may also receive a fourth incoming call because it will not violate the rule that a client station has more than the maximum amount of call legs (e.g., 3). However, the primary device client station 810 will not be able to originate a call for the same reasons as described above in state S2 930 for primary device client station 810 having two active call legs. The active secondary device client station 820 has one active call (e.g., the second incoming call 1115). The active secondary device client station 820 may also receive or originate a fourth incoming call because it will not violate any of the exemplary rules. The inactive secondary device client stations 830-860 remain in the state where they can neither originate nor receive a voice call because it will violate the rule that only one secondary device may be actively handling a call at a given time.

While in the state S3 1140, the carrier network 870 may receive a fourth incoming call 1135 for the account. Since in the state S3 1140 only client stations 810 and 820 are capable of receiving the fourth incoming call 1135, the carrier network 870 will fork the fourth incoming call 1135 to only the client stations 810 and 820 causing client stations 810 and 820 to perform the call waiting function.

The user may select either client station 810 or 820 to answer the fourth incoming call 1135. In this third exemplary scenario, the user may select the active secondary device client station 820 to answer the fourth incoming call 1135 by for example, selecting the "Hold and Accept" dialog box that when selected causes the currently active call (second incoming call 1115) to be placed on hold and the fourth incoming call 1135 to become active. This causes the network arrangement 800 to transition to state S4 1150.

In state S4 1150, the primary device client station 810 has one active call (e.g., the third incoming call 1125) and one call on hold (e.g., the first incoming call 1105). The primary device client station 810 may also receive a fifth incoming call because it will not violate the rule that a client station has more than the maximum amount of call legs (e.g., 3). However, the primary device client station 810 will not be able to originate a call for the same reasons as described above in state S2 930 for primary device client station 810 having two active call legs. The active secondary device client station 820 has one active call (e.g., the fourth incoming call 1135) and one call on hold (e.g., the second incoming call 1115). The active secondary device client station 820 may also receive a fifth incoming call because it will not violate the rule that a client station has more than the maximum amount of call legs (e.g., 3). However, the active secondary device client station 820 will not be able to originate a call for the same reasons as described above in state S2 930 for primary device client station 810 having two active call legs. The inactive secondary device client stations 830-860 remain in the state where they can neither originate nor receive a voice call because it will violate the rule that only one secondary device may be actively handling a call at a given time.

Thus, in state S4 1150, the user is incapable of originating a call because none of the client stations 810-860 may originate a call. If the user desires to originate a call, the user will have to end one of the current calls on either the primary device client station 810 or the active secondary device client station 820 to allow one or both of these client stations 810 or 820 to transition to a state where they can originate a call.

While in the state S4 1150, the carrier network 870 may receive a fifth incoming call 1145 for the account. Since in the state S4 1150 only client stations 810 and 820 are capable of receiving the fifth incoming call 1145, the carrier network 870 will fork the fifth incoming call 1145 to only the client stations 810 and 820 causing client stations 810 and 820 to perform the call waiting function.

The user may select either client station 810 or 820 to answer the fifth incoming call 1145. In this third exemplary scenario, the user may select the primary device client station 810 to answer the fifth incoming call 1145 by for example, selecting the "End Hold and Accept" dialog box that when selected causes the call on hold (e.g., the first incoming call 1105) to disconnect, the currently active call (third incoming call 1125) to be placed on hold and the fifth incoming call 1145 to become active. This causes the network arrangement 800 to transition to state S5 1160.

In state S5 1160, the primary device client station 810 has one active call (e.g., the fifth incoming call 1145) and one call on hold (e.g., the third incoming call 1125). The primary device client station 810 may also receive a sixth incoming call because it will not violate the rule that a client station has more than the maximum amount of call legs (e.g., 3) because the first incoming call 1105 has been disconnected. However, the primary device client station 810 will not be able to originate a call. The active secondary device client station 820 has one active call (e.g., the fourth incoming call 1135) and one call on hold (e.g., the second incoming call 1115). The active secondary device client station 820 may also receive a sixth incoming call, but cannot originate a call. The inactive secondary device client stations 830-860 remain in the state where they can neither originate nor receive a voice call because it will violate the rule that only one secondary device may be actively handling a call at a given time.

It should be noted that there may be exceptions to the above exemplary rules. For example, if the client stations 810-860 were in a state where no additional calls could be received, a new incoming call may be directed to voice mail. In another example, the user may have the ability to make an emergency call (e.g., 911, e911, etc.) at any time from any device whether the device was currently allowed to originate a call or not.

As noted above, the rules and values for the rules are only exemplary and additional rules or different values may be used to govern the call handling scenario. In addition, the above exemplary scenarios are only three possible scenarios of many scenarios based on the exemplary rules or additional rules. Those skilled in the art will understand from the above examples how the rules and values may be applied to different call handling scenarios. For example, it should be apparent in the above exemplary scenarios that incoming calls may be replace with originated calls, except in those situations where the particular device is incapable of originating a call based on the rules.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a wireless capable hardware device enabled with the iOS operating system or Android operating system, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
    at a carrier network:
        designating a plurality of rules for call handling for an account associated with a first telephone number, wherein the first telephone number is assigned to a plurality of client stations, wherein one of the client stations is designated a primary station and remaining client stations are designated secondary stations;
        receiving a first voice call for the account, wherein the first voice call is one of an incoming call for the account or a voice call originated from one of the plurality of client stations;
        receiving a second voice call for the account, wherein the second voice call is one of an incoming call for the account or a voice call originated from one of the plurality of client stations, wherein the second voice call is received while the first voice call is active, and wherein the one of the plurality of client stations is prevented from originating a call when the second voice call is active and the first voice call is on hold; and
        handling the first and second voice calls for the account based on the plurality of rules.

2. The method of claim 1, wherein the plurality of rules includes a maximum number of client stations.

3. The method of claim 1, wherein the plurality of rules includes at least one of i) a maximum number of active call legs that each of the client stations handles, ii) a rule that only one secondary station is handling an active call, or iii) rules that handle the incoming call for the account differently from the voice call originated from one of the plurality of client stations.

4. The method of claim 3, wherein when the carrier network invokes the rule that only one secondary station is handling the active call, the method further comprises:
    one of,
        rejecting voice calls originated from secondary stations that are not handling the active call; or
        sending an indication that one of the secondary stations is handling an active call to the secondary stations that are not handling the active call.

5. The method of claim 1, wherein the plurality of rules for the secondary stations include at least one different rule from the plurality of rules for the primary station.

6. The method of claim 1, wherein the handling the first and second voice calls is further based on information received from an IP Multimedia Subsystem (IMS).

7. The method of claim 1, wherein the first voice call is active on a first one of the plurality of client stations and the second voice call is active on a second one of the plurality of client stations and wherein the first voice call and the second voice call are simultaneously active and the first and second client stations are identified by the first telephone number.

8. The method of claim 1, further comprising:
    receiving a further plurality of voice calls for the account, wherein the further plurality of voice calls are incoming calls for the account or voice calls originating from one of the plurality of client stations, wherein the first voice call, the second voice call and the further plurality of voice calls are simultaneously active and are identified by the first telephone number.

9. The method of claim 1, wherein when one of the plurality of client stations joins the account, the client station is assigned the first telephone number by a telephony provider.

10. The method of claim 1, wherein the plurality of rules limit a number of simultaneous calls handled by the account.

11. A method, comprising:
    at a carrier network:
        receiving an indication that a first telephone number associated with an account is assigned to a plurality of client stations;
        receiving a first incoming voice call for the account;
        sending a first invitation for the first incoming voice call to each of the client stations associated with the account;
        receiving a first response to the first invitation from one of the plurality of client stations associated with the account;
        receiving a second incoming voice call for the account while the first incoming voice call remains active, wherein the one of the plurality of client stations is prevented from originating a call when the second incoming voice call is active and the first incoming voice call is on hold; and
        sending a second invitation for the second incoming voice call to each of the client stations associated with the account.

12. The method of claim 11, further comprising:
    receiving a third incoming voice call for the account while the first and second incoming voice calls remain active; and
    sending a third invitation for the third incoming voice call to each of the client stations associated with the account.

13. The method of claim 11, further comprising:
    receiving a second response to the second invitation from one of the plurality of client stations associated with the account; and
    when the first response and the second response are received from the same one of the plurality of client stations, preventing the same one of the plurality of client stations from originating a voice call while the first and second incoming calls remain active.

14. The method of claim 11, wherein one of the plurality of client stations is designated a primary station and remaining ones of the plurality of client stations are designated secondary stations, the method further comprising:
    when the first response is received from one of the secondary stations, preventing the other ones of the secondary stations from originating a voice call while the first incoming call remains active.

15. The method of claim 11, wherein one of the plurality of client stations is designated a primary station and remaining ones of the plurality of client stations are designated secondary stations, wherein:

when the first response is received from one of the secondary stations, the sending of the second invitation is only to the primary station and the one of the secondary stations from which the first response was received.

16. The method of claim 11, wherein the first response is received from one of the client stations designated as a primary station, the method further comprising:
receiving a second response to the second invitation from one of the plurality of client stations designated as a secondary station;
receiving a third incoming voice call for the account while the first and second incoming voice calls remain active; and
sending a third invitation for the third incoming voice call to only the primary station and the secondary station from which the second response was received.

17. The method of claim 16, further comprising:
receiving a third response to the third invitation from one of the primary station or secondary station; and
receiving a fourth incoming voice call for the account while the first, second and third incoming voice calls remain active; and
sending a fourth invitation for the third incoming voice call to only the primary station and the secondary station.

18. A method, comprising:
at one of a plurality of client stations, wherein a first telephone number is assigned to the plurality of client stations:
registering with a IP Multimedia Subsystem (IMS) of a carrier network;
receiving a first invitation to a first incoming call from the carrier network;
responding to the first invitation causing the first incoming call to be active on the client station;
receiving a second invitation to a second incoming call from the carrier network while the first incoming call remains active; and
responding to the second invitation causing the second incoming call to be active on the client station and the first incoming call to be on hold on the client station,
wherein the client station is prevented from originating a call when the second incoming call is active and the first incoming call is on hold.

19. The method of claim 18, wherein the client station is associated with an account having a plurality of associated client stations and wherein the client station is designated a primary station of the account.

20. The method of claim 18, wherein the client station is associated with an account having a plurality of associated client stations and wherein the client station is designated a secondary station of the account, the method further comprising:
receiving an indication from the carrier network that a further secondary station is actively handling a voice call; and
preventing the client station from originating a call based on the indication that the further secondary station is actively handling a call.

* * * * *

UNITED STATES PATENT AND TRADEMARK OFFICE
CERTIFICATE OF CORRECTION

PATENT NO. : 10,536,491 B2  
APPLICATION NO. : 14/732492  
DATED : January 14, 2020  
INVENTOR(S) : Mathias et al.

Page 1 of 1

It is certified that error appears in the above-identified patent and that said Letters Patent is hereby corrected as shown below:

In the Claims

Claim 3, Column 23, Line 44:
"legs that each of the client stations handles, ii) a rule that" should read "logs that each of the client stations handles, ii) a rule that"

Claim 18, Column 25, Line 31:
"registering with a IP Multimedia Subsystem (IMS) of a" should read "registering with an IP Multimedia Subsystem (IMS) of a"

Signed and Sealed this  
Tenth Day of March, 2020

Andrei Iancu  
*Director of the United States Patent and Trademark Office*